(12) United States Patent
Feldman et al.

(10) Patent No.: US 6,587,781 B2
(45) Date of Patent: Jul. 1, 2003

(54) METHOD AND SYSTEM FOR MODELING AND PROCESSING VEHICULAR TRAFFIC DATA AND INFORMATION AND APPLYING THEREOF

(75) Inventors: Israel Feldman, Herzuya (IL); Arie Trinker, Haifa (IL); Yochai Meltzer, Gnatayim (IL); Allon Eshpar, Kefar-Sava (IL); Amonon Lotem, Hoo-Hasharon (IL)

(73) Assignee: Estimotion, Inc., Wilmington, DE (US)

( * ) Notice: Subject to any disclaimer, the term of this patent is extended or adjusted under 35 U.S.C. 154(b) by 32 days.

(21) Appl. No.: 09/939,620

(22) Filed: Aug. 28, 2001

(65) Prior Publication Data

US 2002/0026278 A1 Feb. 28, 2002

Related U.S. Application Data

(60) Provisional application No. 60/227,905, filed on Aug. 28, 2000.

(51) Int. Cl.$^7$ .......................... G08G 1/09; G08G 1/097; G06F 19/00
(52) U.S. Cl. ....................... 701/117; 701/118; 701/207; 340/934; 340/909
(58) Field of Search ................................ 701/117, 118, 701/200, 207, 300; 340/933, 934, 935, 936, 937, 903, 905, 906, 907, 910, 909, 911, 915, 924; 705/6, 13

(56) References Cited

U.S. PATENT DOCUMENTS

| | | | | |
|---|---|---|---|---|
| 5,845,227 A | * | 12/1998 | Peterson | ...................... 701/209 |
| 6,012,012 A | * | 1/2000 | Fleck et al. | .................. 701/117 |
| 6,236,933 B1 | * | 5/2001 | Lang | ........................... 701/177 |
| 6,240,364 B1 | * | 5/2001 | Kerner et al. | ................ 701/210 |
| 6,314,360 B1 | * | 11/2001 | Becker | ......................... 701/117 |

\* cited by examiner

*Primary Examiner*—Tan Q. Nguyen
(74) *Attorney, Agent, or Firm*—Mark M. Friedman

(57) ABSTRACT

A method and system for modeling and processing vehicular traffic data and information, comprising: (a) transforming a spatial representation of a road network into a network of spatially interdependent and interrelated oriented road sections, for forming an oriented road section network; (b) acquiring a variety of the vehicular traffic data and information associated with the oriented road section network, from a variety of sources; (c) prioritizing, filtering, and controlling, the vehicular traffic data and information acquired from each of the variety of sources; (d) calculating a mean normalized travel time (NTT) value for each oriented road section of said oriented road section network using the prioritized, filtered, and controlled, vehicular traffic data and information associated with each source, for forming a partial current vehicular traffic situation picture associated with each source; (e) fusing the partial current traffic situation picture associated with each source, for generating a single complete current vehicular traffic situation picture associated with entire oriented road section network; (f) predicting a future complete vehicular traffic situation picture associated with the entire oriented road section network; and (g) using the current vehicular traffic situation picture and the future vehicular traffic situation picture for providing a variety of vehicular traffic related service applications to end users.

149 Claims, 8 Drawing Sheets

METHOD AND SYSTEM FOR MODELING AND PROCESSING VEHICULAR TRAFFIC DATA AND INFORMATION AND APPLYING THEREOF

This takes priority from U.S. Provisional Patent Application No. 60/227,905, filed Aug. 28, 2000, entitled "Dynamic Traffic Flow Forecasting, Using Large Volumes Of Privacy Protected Location Data".

FIELD AND BACKGROUND OF THE INVENTION

The present invention relates to the field of vehicular traffic data and information and, more particularly, to a method and system for modeling and processing vehicular traffic data and information, and using the modeled and processed vehicular traffic data and information for providing a variety of vehicular traffic related service applications to end users.

Despite continuing investing in massive amounts of financial and human resources, current road network capacities insufficiently meet the needs dictated by current levels and growth rates of traffic volume. This dilemma relates to current road network capacities, in general, and current road network capacities in urban, suburban, and rural, environments, in particular. Road congestion, or, equivalently, inconveniently high levels or volumes of vehicular road traffic, is a persistent major factor resulting from this dilemma, and needs to be given proper attention and taken into account for efficiently scheduling trips, selecting travel routes, and for attempting to efficiently allocate and exploit time, by individual drivers, as well as by vehicular traffic logistics personnel such as company vehicular fleet managers, responsible for performing such activities. Road congestion and associated traffic data and information also need to be well understood and used by a wide variety of public and private occupations and personnel, such as designers, planners, engineers, coordinators, traffic law makers and enforcers, directly and/or indirectly involved in designing, planning, controlling, engineering, coordinating, and implementing, a wide variety of activities, events, and/or construction projects, which depend upon accurate descriptions of current and future vehicular traffic situations and scenarios. This situation is a main driving force for the on-going development and application of various methods, systems, and devices, for acquiring, analyzing, processing, and applying, vehicular traffic data and information.

There are various prior art techniques for acquiring, analyzing, processing, and applying, vehicular traffic data and information. A few examples of recent prior art in this field are U.S. Pat. No. 6,236,933, issued to Lang, entitled "Instantaneous Traffic Monitoring System", U.S. Pat. No. 6,012,012, issued to Fleck et al., entitled "Method And System For Determining Dynamic Traffic Information", U.S. Pat. No. 6,240,364, issued to Kerner et al., entitled "Method And Device For Providing Traffic Information", and, U.S. Pat. No. 5,845,227, issued to Peterson, entitled "Method And Apparatus For Providing Shortest Elapsed Time Route And Tracking Information To Users".

Prior art techniques typically include calculating velocities of vehicles, for example, by acquiring series of exact locations of the vehicles located along roads in known time intervals, by measuring vehicular traffic flux along roads, especially, along highways, and/or, by a variety of other means known in the field. There are prior art techniques which are either based on, or, include, the use of networks of fixed or static traffic sensors or electronic devices, such as video cameras, induction boxes, tag readers, traffic detectors, and so on, which are installed and fixed along known locations of main traffic arteries and/or traffic volume. Fixed or static traffic sensors or electronic devices, positioned at known locations, relay crossing times of vehicles to a computerized central traffic data and information handling (gathering, collecting, acquiring, analyzing, processing, communicating, distributing) system that consequently calculates velocities of the vehicles between two such sensors.

Significant limitations of developing and implementing comprehensive, highly accurate and precise, techniques for acquiring, analyzing, processing, and applying, vehicular traffic data and information, primarily based upon a system or network of fixed or static traffic sensors or electronic devices, are the relatively large amounts and expense of the necessary infrastructure and maintenance, especially if such resources are to account for and include vehicular traffic data and information associated with a plethora of minor roads characterized by low volumes of vehicular traffic.

More recent prior art techniques are either based on, or, at least include, the use of mobile sensors or electronic devices physically located in or attached to vehicles, each of which is uniquely or specifically designated or assigned to a particular vehicle, whereby the mobile sensors or electronic devices automatically transmit vehicle locations to the computerized central traffic data and information handling system according to pre-determined time intervals, and, whereby, vehicle velocities are relatively simple to calculate for vehicle locations acquired with sufficient accuracy.

For obtaining dynamic vehicle location and velocity data and information, having varying degrees of accuracy and precision, from uniquely or specifically dedicated in-vehicle mobile sensors or electronic devices, such prior art techniques make use of well known global positioning system (GPS) and/or other types of mobile wireless communication or electronic vehicular tracking technologies, such as cellular telephone or radio types of mobile wireless communications networks or systems, involving the use of corresponding mobile wireless devices such as cellular telephones, laptop computers, personal digital assistants (PDAs), transceivers, and other types of telemetric devices, which are uniquely or specifically designated or assigned to a particular vehicle. Establishing and maintaining various communications of the mobile sensors or electronic devices, the computerized central traffic data and information handling system, and, vehicular end-users, are also performed by mobile wireless communication networks or systems, such as cellular telephone mobile wireless communications networks or systems, for example, involving the Internet.

It is noted, however, that due to the requirement of uniquely or specifically designating or assigning each mobile sensor or electronic device to a particular vehicle during the process of gathering, collecting, or acquiring, the vehicular traffic data and information, the potential number of mobile sensors or electronic devices providing dynamic vehicle location and velocity data and information to the computerized central traffic data and information handling system is limited, in proportion to the number of vehicles featuring the particular mobile wireless communication or electronic vehicular tracking technology. For example, currently, there is a significantly larger potential number of vehicles associated with cellular telephone types of a mobile wireless communication network or system compared to the potential number of vehicles associated with GPS types of a mobile wireless communication network or system.

Various specific techniques for manually and electronically gathering, collecting, or acquiring, vehicular traffic data and information are relatively well developed and taught about in the prior art. Moreover, various specific techniques for electronically communicating, sending, or distributing, analyzed and processed vehicular traffic data and information in vehicular traffic related service applications to end users are also relatively well developed and taught about in the prior art. However, there remains a strong on-going need for developing better, more comprehensive, highly accurate and precise, yet, practicable and implementable techniques for analyzing, modeling, and processing, the acquired, collected, or gathered, vehicular traffic data and information. This last aspect is especially true with regard to using vehicular traffic data and information for comprehensively, yet, accurately and practically, describing current and predicting future vehicular traffic situations and scenarios, from which vehicular traffic data and information are used for providing a variety of vehicular traffic related service applications to end users.

In the prior art, a critically important aspect requiring new and improved understanding and enabling description for developing better, more comprehensive, highly accurate and precise, yet, practicable and implementable techniques for analyzing, modeling, and processing, the acquired, collected, or gathered, vehicular traffic data and information, relates to the use of a geographical information system (GIS), or, other similarly organized and detailed spatial representation of a network of roads, for a particular local or wide area region, within which the vehicular traffic data and information are acquired, collected, or gathered. In particular, there is a need for properly and efficiently 'spatially' modeling a road network, and, properly and efficiently 'spatially' modeling, interrelating, and correlating, the vehicular traffic data and information which are acquired, collected, or gathered, among a plurality of sub-regions, sub-areas, or, other designated sub-divisions, within the particular local or wide area region of the spatially modeled road network. Furthermore, there is a particular need for incorporating the factor or dimension of time, for properly and efficiently 'spatially and temporally' defining, interrelating, and correlating, the vehicular traffic data and information which are acquired, collected, or gathered, among the plurality of sub-regions, sub-areas, or, other designated sub-divisions, within the particular local or wide area region of the spatially modeled road network.

In the prior art, another critically important aspect requiring new and improved understanding and enabling description relates to the modeling and processing of vehicular traffic data and information which are acquired, collected, or gathered, using techniques based on cellular telephone types of mobile wireless communications networks or systems, which to date, feature relatively low accuracy and precision of vehicle locations compared to the less widely used, but significantly more highly accurate and precise, GPS types of mobile wireless communication or electronic vehicular tracking technologies.

In prior art, another critically important aspect requiring new and improved understanding and enabling description relates to the modeling and processing of vehicular traffic data and information which are acquired, collected, or gathered, from an 'arbitrary', non-pre-determined or non-designated, population or group of vehicles each including a uniquely or specifically designated or assigned mobile sensor or electronic device, therefore, resulting in a potentially large number of mobile sensors or electronic devices providing dynamic vehicle location and velocity data and information to the computerized central traffic data and information handling system.

In the prior art, another critically important aspect requiring new and improved understanding and enabling description relates to the proper and efficient combining or fusing of a variety of vehicular traffic data and information which are acquired, collected, or gathered, using a combination of a various techniques based on networks of fixed or static traffic sensors or electronic devices, GPS and/or cellular telephone types of mobile wireless communications networks or systems, and, various other manual and electronic types of vehicular traffic data and information such as historical and/or event related vehicular traffic data and information.

In the prior art, another important aspect requiring understanding and enabling description relates to techniques for protecting the privacy of individuals associated with or hosting the sources, that is, the mobile sensors or electronic devices, of vehicular traffic data and information which are acquired, collected, or gathered, using techniques based on GPS and/or cellular telephone types of mobile wireless communications networks or systems. The inventors are unaware of any prior art teaching for performing this in the field of vehicular traffic data and information.

There is thus a strong need for, and it would be highly advantageous to have a method and system for modeling and processing vehicular traffic data and information, and using the modeled and processed vehicular traffic data and information for providing a variety of vehicular traffic related service applications to end users. Moreover, there is a particular need for such a generally applicable method and system with regard to using vehicular traffic data and information for comprehensively, yet, accurately and practicably, describing current and predicting future vehicular traffic situations and scenarios, from which vehicular traffic data and information are used for providing the variety of vehicular traffic related service applications to the end users.

SUMMARY OF THE INVENTION

The present invention relates to a method and system for modeling and processing vehicular traffic data and information, and using the modeled and processed vehicular traffic data and information for providing a variety of vehicular traffic related service applications to end users. The present invention especially includes features for using vehicular traffic data and information for comprehensively, yet, accurately and practicably, describing current and predicting future vehicular traffic situations and scenarios, from which vehicular traffic data and information are used for providing the variety of vehicular traffic related service applications to the end users.

Thus, according to the present invention, there is provided a method and a system for modeling and processing vehicular traffic data and information, comprising: (a) transforming a spatial representation of a road network into a network of spatially interdependent and interrelated oriented road sections, for forming an oriented road section network; (b) acquiring a variety of the vehicular traffic data and information associated with the oriented road section network, from a variety of sources; (c) prioritizing, filtering, and controlling, the vehicular traffic data and information acquired from each of the variety of sources; (d) calculating a mean normalized travel time (NTT) value for each oriented road section of said oriented road section network using the prioritized, filtered, and controlled, vehicular traffic data and information associated with each source, for forming a partial current vehicular traffic situation picture associated with each source; (e) fusing the partial current traffic situation picture associated with each source, for generating a single complete current vehicular traffic situation picture associated with entire oriented road section network; (f) predicting a future complete vehicular traffic situation picture associated with the entire oriented road section network; and (g) using the current vehicular traffic situation picture and the future vehicular traffic situation picture for providing a variety of vehicular traffic related service applications to end users.

The present invention successfully overcomes all the previously described shortcomings and limitations of presently known techniques for analyzing, modeling, and processing, the acquired, collected, or gathered, vehicular traffic data and information. Especially with regard to using vehicular traffic data and information for comprehensively, yet, accurately and practicably, describing current and predicting future vehicular traffic situations and scenarios, from which vehicular traffic data and information are used for providing a variety of vehicular traffic related service applications to end users. Another important benefit of the present invention is that it is generally applicable and complementary to various different 'upstream' prior art techniques of gathering, collecting, or acquiring, vehicular traffic data and information, and, generally applicable and complementary to various different 'downstream' prior art techniques of electronically communicating, sending, or distributing, the analyzed, modeled, and processed, vehicular traffic data and information in vehicular traffic related service applications to end users.

Implementation of the method and system for modeling and processing vehicular traffic data and information, and using the modeled and processed vehicular traffic data and information for providing a variety of vehicular traffic related service applications to end users, according to the present invention, involves performing or completing selected tasks or steps manually, automatically, or a combination thereof. Moreover, according to actual instrumentation and/or equipment used for implementing a particular preferred embodiment of the disclosed invention, several selected steps of the present invention could be performed by hardware, by software on any operating system of any firmware, or a combination thereof. In particular, as hardware, selected steps of the invention could be performed by a computerized network, a computer, a computer chip, an electronic circuit, hard-wired circuitry, or a combination thereof, involving any number of digital and/or analog, electrical and/or electronic, components, operations, and protocols. Additionally, or alternatively, as software, selected steps of the invention could be performed by a data processor, such as a computing platform, executing a plurality of computer program types of software instructions or protocols using any suitable computer operating system.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
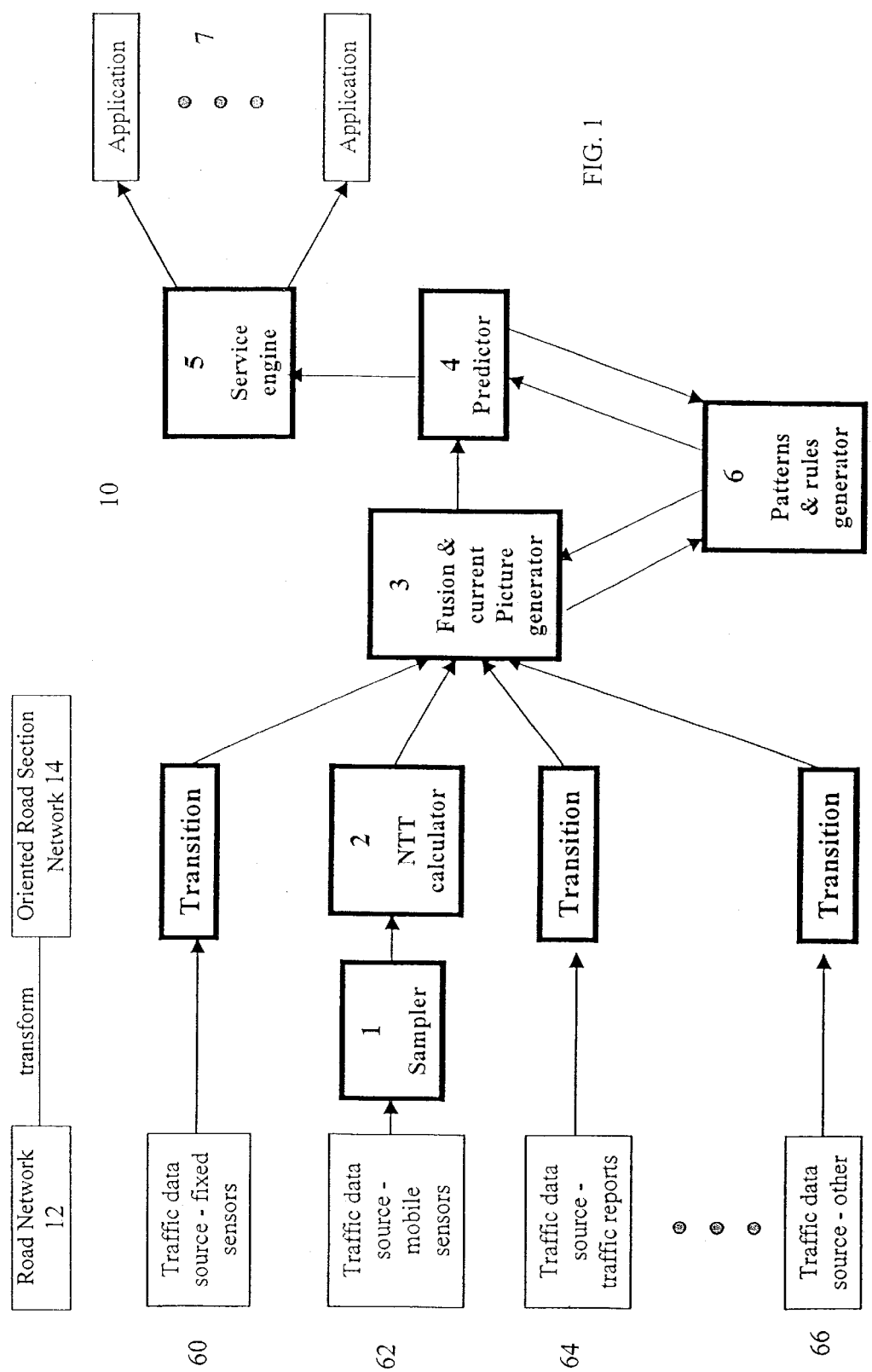
FIG. 1 is a block flow diagram of a preferred embodiment of the method and system for modeling and processing vehicular traffic data and information, and using the modeled and processed vehicular traffic data and information for providing a variety of vehicular traffic related service applications to end users, in accordance with the present invention.

The present invention takes priority from U.S. Provisional Patent Application No. 60/227,905, filed Aug. 28, 2000, entitled "Dynamic Traffic Flow Forecasting, Using Large Volumes Of Privacy Protected Location Data", the teachings of which are incorporated by reference as if fully set forth herein.

The present invention relates to a method and system for modeling and processing vehicular traffic data and information, and using the modeled and processed vehicular traffic data and information for providing a variety of vehicular traffic related service applications to end users. The present invention especially includes features for using vehicular traffic data and information comprehensively, yet, accurately and practicably, describing current and predicting future vehicular traffic situations and scenarios, from which vehicular traffic data and information are used for providing the variety of vehicular traffic related service applications to the end users.

The present invention features several aspects of novelty and inventive step over the prior art, for developing better, more comprehensive, highly accurate and precise, yet, practicable and implementable techniques for analyzing, modeling, and processing, the acquired, collected, or gathered, vehicular traffic data and information. Several main aspects of the present invention are described in more detail thereafter.

One main aspect of the present invention relates to the adaptation and modeling of a geographical information system (GIS), or, other similarly organized and detailed spatial representation of a network of roads, for a particular local or wide area region, within which the vehicular traffic data and information are acquired, collected, or gathered. In particular, there is efficiently 'spatially' modeling the road network, in order to accommodate and fit the variety of vehicular traffic data and information, while limiting the amount of data and information needed to be stored and handled. By way of this adaptation and modeling of a road network, especially a GIS type of road network, there is also properly and efficiently 'spatially' modeling, interrelating, and correlating, the vehicular traffic data and information which are acquired, collected, or gathered, among a plurality of sub-regions, sub-areas, or, other designated sub-divisions, within the particular local or wide area region of the spatially defined road network. Furthermore, there is incorporating the factor or dimension of time, for properly and efficiently 'spatially and temporally' defining, interrelating, and correlating, the vehicular traffic data and information which are acquired, collected, or gathered, among the plurality of sub-regions, sub-areas, or, other designated sub-divisions, within the particular local or wide area region of the spatially defined road network.

Another main aspect of the present invention relates to the modeling and processing of vehicular traffic data and information which are acquired, collected, or gathered, using techniques based on mobile wireless communication networks or systems, such as cellular telephone types of networks and systems, which to date, feature relatively low accuracy and precision of vehicle locations compared to the less widely used, but significantly more highly accurate and precise, GPS types of mobile wireless communication or electronic vehicular tracking technologies.

Another main aspect of the present invention relates to the modeling and processing of vehicular traffic data and information which are acquired, collected, or gathered, from an 'arbitrary', non-pre-determined or non-designated, population or group of vehicles each including a uniquely or specifically designated or assigned mobile sensor or electronic device, therefore, resulting in a potentially large number of mobile sensors or electronic devices providing dynamic vehicle location and velocity data and information to the computerized central traffic data and information handling system.

Another main aspect of the present invention relates to efficient combining or fusing of a variety of vehicular traffic data and information which are acquired, collected, or gathered, using a combination of various techniques based on networks of fixed or static traffic sensors or electronic devices, mobile wireless communications networks or systems such as GPS and/or cellular telephone networks or systems, and, various other manual and electronic types of vehicular traffic data and information such as traffic reports, incorporating in the fusion process the historical and/or event related vehicular traffic data and information that is accumulated, analyzed, and processed, from previously accumulated vehicular traffic data and information in the same system.

Another main aspect of the present invention relates to techniques for protecting the privacy of individuals associated with or hosting the sources, that is, the mobile sensors or electronic devices, of vehicular traffic data and information which are acquired, collected, or gathered, using techniques based on GPS and/or cellular telephone types of mobile wireless communications networks or systems. The inventors are unaware of any prior art teaching for performing this in the field of vehicular traffic data and information.

It is to be understood that the present invention is not limited in its application to the details of the order or sequence of steps of operation or implementation of the method, or, to the details of construction and arrangement of the various devices and components of the system, set forth in the following description and drawings. For example, the following description refers to a cellular telephone type of mobile wireless communication network, or system as the primary source of electronically acquired vehicular data and information, in order to illustrate implementation of the present invention. As indicated below, additionally, or, alternatively, other types of mobile wireless communication networks or systems function as sources of electronically acquired vehicular data and information. Accordingly, the invention is capable of other embodiments or of being practiced or carried out in various ways. Also, it is to be understood that the phraseology and terminology employed herein are for the purpose of description and should not be regarded as limiting.

Steps, components, operation, and implementation of a method and system for modeling and processing vehicular traffic data and information, and using the modeled and processed vehicular traffic data and information for providing a variety of vehicular traffic related service applications to end users, according to the present invention are better understood with reference to the following description and accompanying drawings. Throughout the following description and accompanying drawings, like reference numbers refer to like elements.

Referring now to the drawings, FIG. 1 is a block flow diagram of a preferred embodiment of the method and system, hereinafter, generally referred to as method/system 10, of the present invention. Terminology and referenced items appearing in the following description of FIG. 1 are consistent with those used in FIGS. 1 through 8.

In Step (a) of the method of the present invention, there is transforming a spatial representation of a road network into a network of spatially interdependent and interrelated oriented road sections, for forming an oriented road section network.

Specifically, there is transforming a spatial representation of a road network 12 into a network of spatially interdependent and interrelated oriented road sections, for forming an oriented road section network 14. Preferably, road network 12 is a geographical information system (GIS) type of road network 12, which is well known in the art of vehicular road traffic data and information. Typically, a GIS type of road network 12 is a detailed spatial representation of a road network encompassing a particular local or wide area region, within which are a plurality of sub-regions, sub-areas, or, other designated sub-divisions, such as roads, turns, junctions, and, areas or regions of variably populated streets and roads. Associated with road network 12, and consequently, oriented road section network 14, are the vehicular traffic data and information which are acquired, collected, or gathered, among the plurality of sub-regions, sub-areas, or, other designated sub-divisions. Step (a) corresponds to an initialization step when method/system 10 is applied to a new geographical region or road network 12. Vehicular traffic data and information are subsequently added, by various manual and/or electronic means, to the oriented road section network 14 model of a GIS type of road network 12.

The approach of the present invention to the field of vehicular traffic data and information, in general, and to the problematic situation of vehicular traffic congestion, in particular, is from a 'holistic' point of view, emphasizing the importance of an entire road network 12 encompassing a particular local or wide area region, and the interdependence and interrelation of the plurality of sub-regions, sub-areas, or, other designated sub-divisions of road network 12. This is accomplished by adapting and transforming a spatial representation of road network 12 into a network of spatially interdependent and interrelated oriented road sections, for forming oriented road section network 14. This process is conceptually analogous to transforming road network 12 into an intertwined weave of oriented road sections, for forming oriented road section network 14.

Figure 2:
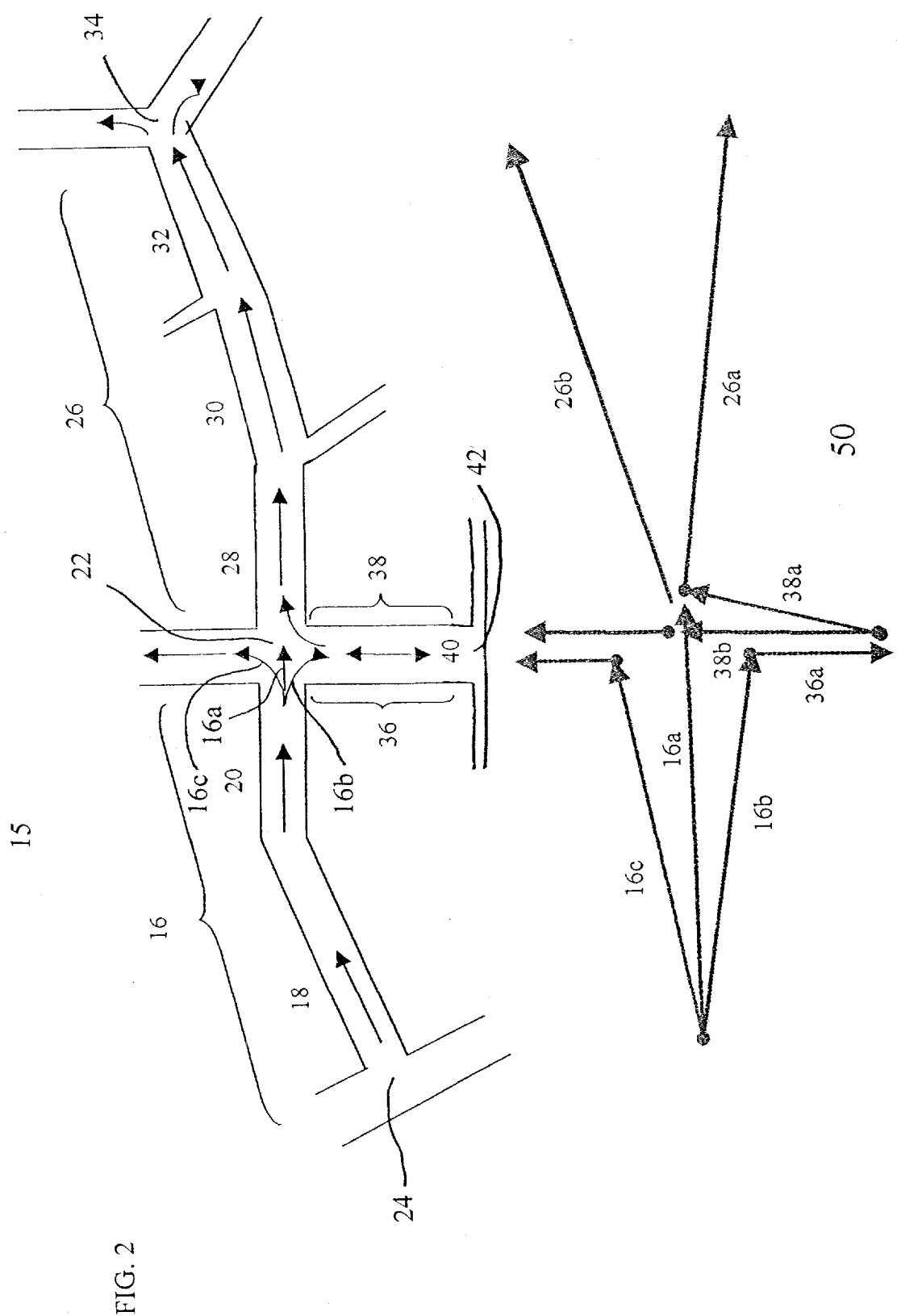
FIG. 2 is a schematic diagram illustrating a preferred embodiment of modeling a road network in terms of 'oriented road sections' as part of, and in relation to, oriented road section network 14 of method/system 10 of FIG. 1, in accordance with the present invention.

FIG. 2 is a schematic diagram illustrating a preferred embodiment of modeling a road network in terms of 'oriented road sections' as part of, and in relation to, oriented road section network 14 of method/system 10 of FIG. 1. In the upper part of FIG. 2, direction of vehicular traffic flow is indicated by the arrows drawn inside the road segments and inside the road junctions. Herein, the term 'road section', in general, represents a unit featuring at least one consecutive road segment of a road network, preferably, a GIS type of road network, where the at least one road segment, positioned head-to-tail relative to each other, are located between two road junctions, referred to as a tail end road junction and a head end road junction, within the road network, and are characterized by similar vehicular traffic data and information. In practice, typically, a 'road section' represents a unit featuring a set of a plurality of consecutive road segments of a road network, preferably, a GIS type of road network, where the consecutive road segments, positioned head-to-tail relative to each other, are located between two road junctions, a tail end road junction and a head end road junction, within the road network, and are characterized by similar vehicular traffic data and information. For purposes of effectively modeling a particular road network, a plurality of road segments are therefore combined into a single homogeneous or uniform road section characterized by homogeneous or uniform vehicular traffic data and information. Accordingly, the road network is modeled as a plurality of road sections.

Accordingly, in the upper part of FIG. 2, generally indicated as 15, a road section, as a first example, road section 16, represents a unit featuring a set of a plurality of, for example, two, consecutive road segments 18 and 20 of a road network (12 in FIG. 1, partly shown in FIG. 2), where consecutive road segments 18 and 20 are positioned head-to-tail relative to each other, are located between two road junctions, in particular, head end road junction 22 and tail end road junction 24, within the road network, and are characterized by similar vehicular traffic data and information. As a second example, road section 26, represents a unit featuring a set of a plurality of, for example, three, consecutive road segments 28, 30, and, 32, within the same road network (12 in FIG. 1, partly shown in FIG. 2), where consecutive road segments 28, 30, and, 32, are positioned head-to-tail relative to each other, are located between two road junctions, in particular, head end road junction 34 and tail end road junction 22, within the road network, and are characterized by similar vehicular traffic data and information.

Two additional examples, relating to the two directions of a bi-directional street, of a road section, are road section 36 and road section 38, each representing a single consecutive road segment 40, within the road network (12 in FIG. 1, partly shown in FIG. 2), where consecutive road segment 40 is positioned head-to-tail (relative to itself and oppositely for each of the two directions), located between two road junctions, in particular, head end road junction 42 and tail end road junction 22, and, head end road junction 22 and tail end road junction 42, respectively, within the road network, and each is characterized by a particular vehicular traffic data and information, according to each of the two directions, respectively.

Herein, the term 'oriented road section' represents a road section having a single vehicular traffic continuation option located at the head end road junction. Herein, a single vehicular traffic continuation option refers to one of the various vehicular traffic flow options a vehicle may take, such as optionally continuing to travel straight, optionally taking a right turn, or, optionally taking a left turn, from a particular road segment joined or linked to the head end road junction. Accordingly, a vehicular traffic continuation option is selected from the group consisting of continuing to travel straight, taking a right turn and, taking a left turn, from a particular road segment joined or linked to the head end road junction.

Accordingly, in the lower part of FIG. 2, generally indicated as 50, shown are eight oriented road sections, that is, oriented road sections 16a, 16b, 16c, associated with road section 16; oriented road sections 26a and 26b, associated with road section 26; oriented road section 36a, associated with road section 36; and, oriented road sections 38a and 38b, associated with road section 38. Each oriented road section has a single vehicular traffic continuation option, that is, a vehicular traffic continuation option selected from the group consisting of continuing to travel straight, taking a right turn, and, taking a left turn, from the particular road segment joined or linked to the associated head end road junction, as shown by the arrows in the lower part of FIG. 2, corresponding to the arrows in the upper part of FIG. 1, indicating direction of vehicular traffic flow drawn inside the road segments and inside the road junctions.

An equally alternative way of defining the term oriented road section is that, a road section having a head end road junction with a particular plurality of vehicular traffic continuation options is split or divided into that particular plurality of oriented road sections. Accordingly, in FIG. 2, for example, road section 16 having head end road junction 22 with a plurality of three vehicular traffic continuation options, that is, vehicular traffic continuation option 16a (continuing to travel straight), 16b (taking a right turn), and, 16c (taking a left turn), is split or divided into a plurality of three oriented road sections 16a, 16b, and 16c, respectively.

When special lanes in the various road segments within the oriented road section network are assigned to turning traffic, the respective oriented road sections may yield different vehicular traffic data and information, such as different values relating to road congestion or heavy vehicular traffic volume. This representation of a road network enables the incorporation of interdependence and interrelation among the plurality of road segments, the plurality of road sections, and, the plurality of oriented road sections. In particular, the oriented road section network model of a road network accounts for the significant influence of road junctions on vehicular traffic flow and associated travel time delays. Moreover, there is strong interdependence and interrelation between any given particular oriented road section characterized by a particular traffic situation or scenario and other oriented road sections in the same vicinity, either crossing or parallel to the particular oriented road section.

In Step (b), there is acquiring a variety of vehicular traffic data and information associated with the oriented road section network, from a variety of sources.

An important aspect of the present invention is the ability to model and process a wide variety of vehicular traffic data and information, in particular, which are used for generating current and future vehicular traffic situation pictures. Referring to method/system 10 of FIG. 1, sources of vehicular traffic data and information are selected from the group consisting of sources 60 of fixed sensors, sources 62 of mobile sensors, sources 64 of traffic reports by police or radio broadcasts of vehicular traffic data and information, other sources 66, and combinations thereof. Each of the variety of acquired, collected, or, gathered, vehicular traffic data and information, is characterized by a variable level of accuracy, and is independent of any other specific characteristics of the corresponding source.

Systems of fixed sensors and traffic reports of historical and/or event related vehicular traffic data and information are presently the most common sources of vehicular traffic data and information, and are well known in the art of vehicular traffic data and information. However, the present invention features mobile sensors as most advantageous for acquiring vehicular traffic data and information, even though they have lower confidence levels. A growing number of mobile wireless communication devices are increasingly being installed or carried in vehicles, and are capable of transmitting vehicular locations to a computerized central data and information receiving and processing system. Such mobile wireless communication devices are telemetric devices with GPS capabilities, anti-theft devices, and, driver-carried devices such as computer laptops and cellular phones. The respective computerized central data and information receiving and processing systems have capabilities of locating these devices, and act as sources of vehicular traffic data and information for assessing traffic situations. The variability of these devices and the spreading popularity of some of them leads to an abundant and widespread population of mobile sensors. However, some of these systems, such as a cellular telephone wireless communication networks, have poor location accuracy, and therefore require elaborate and unique processing in order to extract useful vehicular traffic data and information.

In principle, method/system 10 of the present invention is applicable to all types of mobile sensor systems, and models and processes the variability of location accuracy, vehicular traffic movement data and information, reading time intervals, and other types of vehicular traffic data and information as further described below. Method/system 10 acquires vehicular traffic data and information from several such sources in parallel and combines or fuses the acquired vehicular traffic data and information into one coherent and complete vehicular traffic situation picture.

Acquiring the vehicular traffic data and information from a mobile sensor system is performed by tracking a sample of mobile sensors 62 (FIG. 1) that are carried in moving vehicles. Locations of mobile sensors 62 are obtained from the mobile network in known time intervals, and accordingly, the path of the vehicle is identified in terms of a plurality of oriented road sections featured in the oriented road section network, for example, the plurality of exemplary oriented road sections shown in FIG. 2 featured in oriented road section network 14 (FIG. 1), and the velocity of a given vehicle on the different road sections of the identified path are calculated. A statistical processing of the velocities of all mobile sensors 62 that traveled on a specific oriented road section during the time period of an assessment cycle yields a normalized travel time (NTT) value, hereinafter, also referred to as an NTT value, on that specific oriented road section, where the normalized travel time refers to a travel time normalized with respect to a predetermined distance, for example, in a non-limiting fashion, normalized with respect to a distance having a range of between about 10 meters to about 100 meters, preferably, a distance of 100 meters. When more than one such NTT value is calculated, a possibility of different velocities on different lanes of a particular oriented road section is indicated.

In Step (c), there is prioritizing, filtering, and controlling, the vehicular traffic data and information acquired from each of the variety of sources.

In this step of implementing method/system 10, consideration is given to various aspects relating to prioritizing, filtering, and controlling, the vehicular traffic data and information acquired from each of the variety of sources. For example, filtering noise corresponding to irrelevant sensors and erroneous data.

With respect to the choice of the sampled mobile sensor devices, sampling policy or prioritizing the variety of vehicular traffic data and information, and controlling the sampling of the vehicular traffic data and information, statistical consideration show that a very small percentage, approximately 1–2%, of moving vehicles provide a sufficient base to obtain the necessary data. The number of moving sensors is, however, huge, and there is need to efficiently choose the sample population, to decide on a sampling policy, and to control its carrying out so that the data collected will be as relevant as possible for the purpose of vehicular traffic assessment.

The choice of sample units is done by making sure that they are in high probability moving-vehicle-carried. In cellular telephone networks, this is done by identifying phones whose cell-handover rates indicate a relatively fast movement. A parallel procedure is performed for any mobile sensor source. In mobile anti-theft systems, for example, vehicular ignition activation is a valid indicator of 'movement-suspicion'. This initial choice of sensor population assures, for example, that pedestrians will not be included, and so prevents, along the track, the confusion between walking pedestrians and slowing traffic due to heavy congestion.

Data acquisition from cellular phones is controlled by a server connected to a particular cellular phone network. The operation of cellular phones provokes a large amount of administrative and control messages that flow in the cellular phone network whenever any cellular event occurs. For example, initiation of a call, completion of a call, transmission of a short message service (SMS) message, a cell transition or handover, etc. The server of the cellular phone network monitors these messages and intercepts those that indicate 'movement' of cellular phone holders, for example, phones whose cell handovers rate can point to a vehicle speed.

Those cellular phones that are suspected as being 'vehicle-carried' are immediately tracked for their locations using the handovers themselves as 'footprints' or 'footsteps', and/or other locating capability of the cellular phone network. Different particular cellular phone networks use different locating techniques and systems, each having a different characteristic locating accuracy. Method/system 10 is independent of specific locating techniques and systems, and is suited to a variability of accuracy and precision levels. For example, a common difficulty concerning locating accuracy and precision of a mobile sensor network is the phenomenon of 'noise', such as that caused by reflections, low cell-efficiency management, and/or, even errors. As a result of this, a substantial number of the footprints is erroneous, whereby they do not represent real or actual sensor locations.

The tracking of the 'moving' phones is done by polling their locations in known time intervals. This operation is controlled by Sampler software module 1 indicated in FIG. 1. Sampler software module 1 regulates the sampling so that it will be most efficient. Specifically, for example, Sampler software module 1 (i) filters out cellular phones that are recognized as 'noise', (ii) prioritizes the vehicular traffic data and information acquisition according to policy or present vehicular traffic circumstances, (iii) prevents tracking cellular phones that stopped moving, and, (iv) maintains the sampling procedure within the locating capacity of the particular cellular phone network.

Once the 'moving' sensors are identified, method/system 10 includes them in the sample population and controls the flow of the vehicular traffic data and information according to actual features and capabilities of method/system 10, in general, and of Sampler software module 1, in particular, and, according to changing locations of the moving sensors along their respective paths. For example, Sampler software module 1 obtains the vehicular traffic data and information by 'push' or 'pull' procedures, that is, where 'push' is a mode of receiving the vehicular traffic data and information that is initiated by source 62 of the mobile sensors, and, where 'pull' is a mode of receiving the vehicular traffic data and information when the initiator is Sampler software module 1. This tracking operation is controlled by method/system 10 according to a predefined and updated policy. For instance, according to a policy of 'not to track too many vehicles in a same region', 'focus the tracking on a certain problematic region', 'stop tracking a vehicle that stopped for a predetermined time interval', and, 'collect vehicular traffic data and information within a certain limited capacity of the cellular phone network'.

As previously indicated, a main aspect of the present invention relates to techniques for protecting the privacy of individuals associated with, or hosting, the sources 62 (FIG. 2) of the mobile sensors or electronic devices, of the vehicular traffic data and information which are acquired, collected, or gathered, using techniques based on GPS and/or cellular telephone types of mobile wireless communications networks or systems. Tracking vehicles without the knowledge and consent of their drivers may be considered as violation of privacy. Method/system 10, in general, and technical architecture of method/system 10, in particular, are designed for deleting identities of the associated sample units, and for deleting individual sensor tracks once their derived velocities are incorporated into calculations and processing associated with the plurality of oriented road sections within oriented road section network 14.

Moreover, these processing steps take place in a server that is connected to the mobile sensor source network. When more than one mobile sensor source provides vehicular traffic data and information to method/system 10, such a server is in communication with each of the data providers. Tracked vehicles are not identified by using phone numbers. Even within the short tracking times, mobile sensor identities are kept within the location of the cellular phone network, so that during the whole process, privacy of cellular phone users is protected.

In Step (d), there is calculating a mean normalized travel time (NTT) value for each oriented road section of the oriented road section network using the prioritized, filtered, and controlled, vehicular traffic data and information associated with each source, for forming a partial current vehicular traffic situation picture associated with each source.

Prioritized, filtered, and controlled, vehicular traffic data and information associated with each source are transmitted from Sampler software module 1 to NTT calculator software module 2, as indicated in FIG. 1. In this step of implementing method/system 10 (FIG. 1), consideration is given to assessment of normalized travel times (NTTs) values on oriented road sections, from individual calculated values of NTTs, and, to inaccuracy problems relating to identifying the path of a sample, and in extracting and calculating the NTT values.

Data from fixed sensors are usually received in terms of velocity or NTT values. Transition of these values for processing according to the model of method/system 10 of the present invention is straightforward to one of ordinary skill in the art, and is not further described herein. Vehicular traffic data and information obtained from traffic reports are handled manually and used for determining specific NTT values on oriented road sections or the specific patterns to be used. Vehicular traffic data and information from mobile sensor sources is processed in a more elaborate way. As previously indicated, above, in this description of the preferred embodiments, source 62 of the plurality of mobile sensors is represented as a cellular phone network, being the most complex one, but is generally applicable to other mobile wireless communication networks or systems operating with a plurality of mobile sensors or electronic devices.

Specifically applicable to vehicular traffic data and information associated with the mobile cellular phone network source, there is identifying a path taken by each vehicle and calculating a mean normalized travel time (NTT) value for each oriented road section of oriented road section network 14 (FIG. 1) using the prioritized, filtered, and controlled vehicular traffic data and information, for forming a partial current vehicular traffic situation picture associated with the cellular phone network source.

Location readings acquired from mobile sensor networks are the 'footprints' of the sensor's track. When footprints are inaccurate, they are represented by geometrical areas, whose form and size depend on the particular features of the locating method. In cellular phone networks, footprints can be the cells themselves, with or without time-advance data, and their graphic representation is by segments of circle sectors whose coverage can reach dimensions between tens and thousands of meters. Another type of footprint associated with cellular phone networks is a cell-handover, whose graphic representation is dictated by the relative position of the two cells involved in the 'handover'.

Specific characteristics of the location data obtained from the variety of mobile sensor networks varies with the network, whereby, method/system 10 accounts for them in a generic way, by implementing statistical methods and algorithms that rely on some assumptions as to the reasonable behavior of vehicular drivers. The path of the vehicle is deduced out of several consecutive readings. The deduced path is the sequence of connected oriented road sections that cross the location areas in the order of their appearance, and which join into a logical route to take between two points. In this step, some of the 'noise' is discovered, for example, footprints that went beyond bounds of a 'sensible' travel route. Additionally, those mobile sensors that are not relevant for example, those carried in trains, are also identified. Those single footprints or irrelevant sample units are immediately rejected and their tracking is stopped.

The NTTs of the vehicle on every section of the deduced path is calculated using the timings of the footprints. The vehicle's position on the road at the reading's moment is determined by introducing some additional assumptions, like minimal acceleration and minimal velocity. The size of the footprints of a specific source influences the resolution of the oriented road sections that can be valued. Actually, the method emphasizes the more congested roads, because they statistically offer more readings. Those are identified even if they are minor roads, but, with worse accuracy. However, there will always be smaller streets and roads that this system will fail to exactly identify. Those areas of smaller streets, confined and closed within higher level arteries of the road network are referred to as 'regions' in the road network. Method/system 10 identifies 'passage' of the mobile sensor in such a region, and determines the average NTT value in that region. Indetermination of specific streets within regions of the road network is insignificant for the purpose of implementing method/system 10, because they usually behave in a similar way, otherwise specific streets that are more congested would stand out in the first place.

NTT values on an individual oriented section are calculated using the results obtained from all mobile sensors that passed that oriented road section, hence resulting in statistically determined NTT values for each oriented road section. The unification of the individual NTT values into a determined value per oriented road section is done with consideration of the confidence factor of each of the individual data. This confidence factor is a function of the accuracy, the amount of footprints, the error rate, and so on.

In the transition process from individual to comprehensive NTT values, an additional filtering stage takes place. Irregularities of some sensors may again indicate irrelevancy (stationed or slow moving vehicle, stop-and-go vehicles like trash collectors, etc.) or error. Data from those mobile sensors are rejected and filtered out of the continuation in the processing of the data. The outcome of this step in method/system 10 is an NTT picture of the oriented road sections for a certain time stamp, as calculated and assessed out of the specific network of mobile sensors. Accordingly, there is forming a partial current vehicular traffic situation picture associated with each network source of mobile sensors.

As indicated in FIG. 1, prioritized, filtered, and controlled, vehicular traffic data and information associated with each source are transmitted from Sampler software module 1 to NTT calculator software module 2. NTT calculator software module 2 identifies the path taken by every vehicle from the consecutive footsteps of the mobile sensor associated with each vehicle. A small number of low-accuracy locations can fit several possible paths, but with each additional footstep of the vehicle, the number of path alternatives is reduced, and the path is determined by method/system 10 only when the set of footsteps points to one path in high probability. The probability influences the confidentiality of the path.

Figure 3:
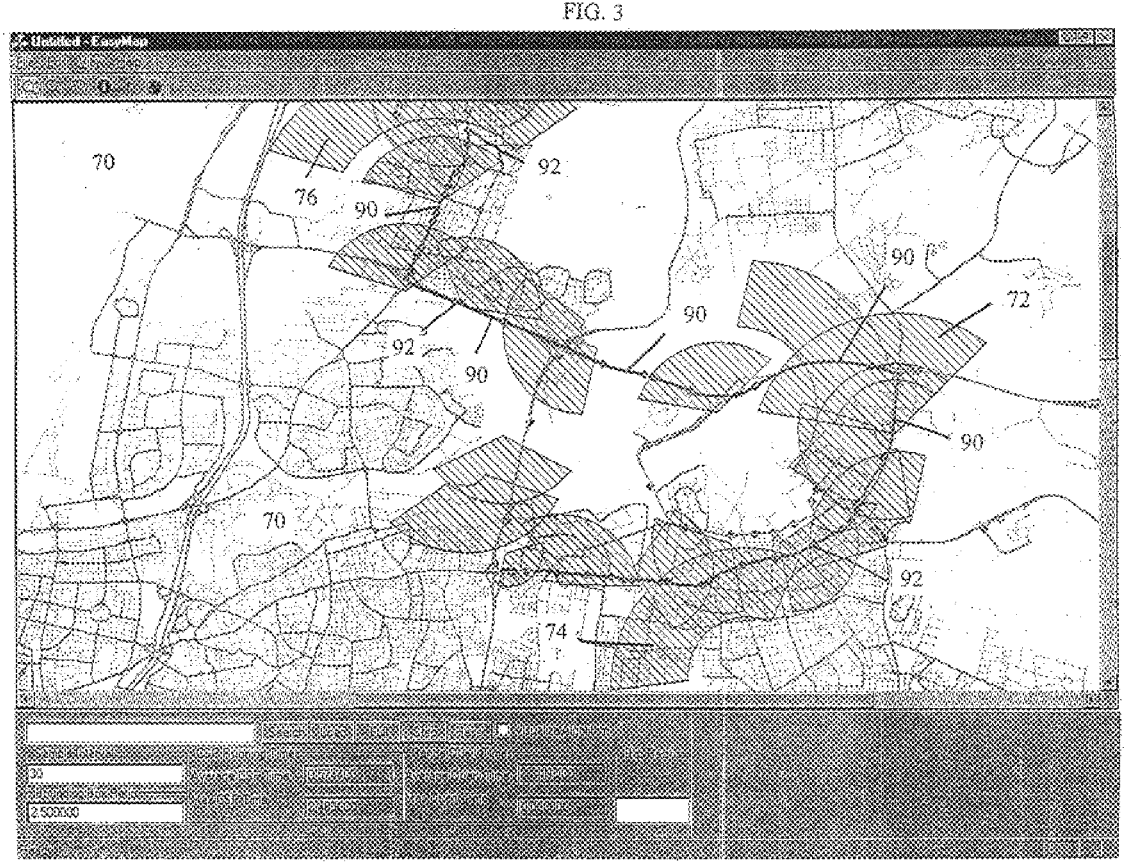
FIG. 3 is a pictorial diagram illustrating exemplary results obtained from the process of path identification using vehicular traffic data and information acquired from mobile sensors of a cellular phone mobile communication network, in accordance with the present invention.
Figure 4:
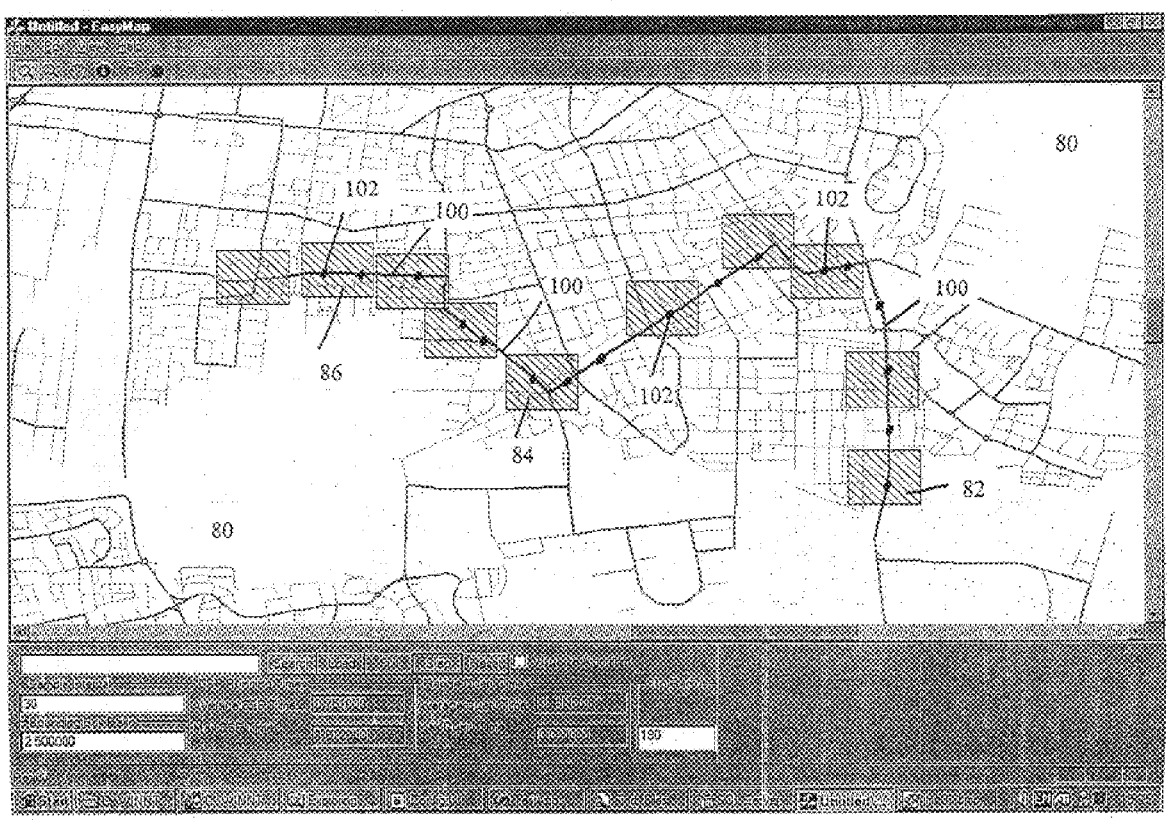
FIG. 4 is a pictorial diagram illustrating exemplary results obtained from the process of path identification using vehicular traffic data and information acquired from mobile sensors of an anti-theft mobile communication network, in accordance with the present invention.

FIG. 3 is a pictorial diagram illustrating exemplary results obtained from the process of path identification using vehicular traffic data and information acquired from mobile sensors of a cellular phone mobile communication network, and, FIG. 4 is a pictorial diagram illustrating exemplary results obtained from the process of path identification using vehicular traffic data and information acquired from mobile sensors of an anti-theft mobile communication network. For purposes of clarity, background 70 in FIG. 3, and, background 80 in FIG. 4, each corresponds to a GIS type representation of road network 12 (FIG. 1).

Sectors, for example, sectors 72, 74, and, 76, in FIG. 3, and, squares, for example, squares 82, 84, and, 86, in FIG. 4, represent the footprints corresponding to the tracking data obtained from the two different types of mobile communication networks, that is, from a cellular phone mobile communication network, and, from an anti-theft mobile communication network respectively. Location accuracy in FIGS. 3 and 4 is approximately 0.5–1.0 km. In FIGS. 3 and 4, the path identified by NTT calculator software module 2 of method 1 system 10 is indicated by the dark lined path, that is, dark lined path 90 in FIG. 3, and, dark lined path 100 in FIG. 4, which is exactly the one taken by the vehicle, as shown by highly accurate readings, indicated by the set of small solid diamonds 92 in FIG. 3, and, by the set of small solid circles 102 in FIG. 4, obtained from a GPS tracking system serving as control data.

Once a path is identified, the normalized travel times (NTTs) values between the footsteps are calculated, hence, NTT values of the plurality of oriented road sections for an individual vehicle are assessed. At this stage, the determined path of the mobile sensor may be identified as crossing a 'region' of streets having low vehicular traffic congestion. Ordinarily, footprint accuracy prevents identification of specific streets in such a region. NTT calculator software module 2 processes such regions as a special type of oriented road section and allocates the region with a calculated NTT value that is a good average indicating crossing time of the region, no matter which one of the inner roads is traveled along by the vehicle.

In the next part of Step (d) of method/system 10, individual NTT values calculated in a given processing cycle for every oriented road section are accumulated and statistically analyzed for providing a mean NTT value for each respective oriented road section. Eventually, more than one NTT (statistical 'peak') value is identified, thereby, suggesting the possibility of different lanes having different NTT values. Such a situation occurs, for example, when an oriented road section has several lanes, each with a different NTT value.

Figure 5:
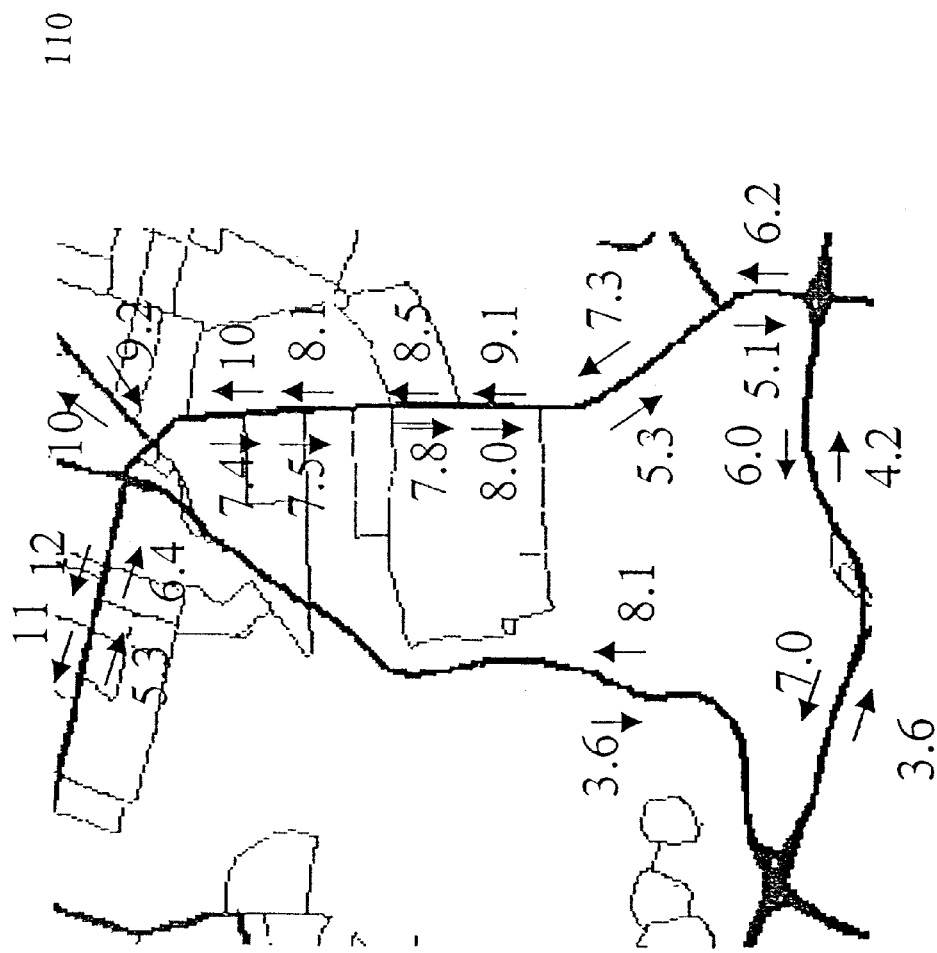
FIG. 5 is a schematic diagram illustrating a partial current vehicular traffic situation picture featuring current NTT values obtained from an exemplary network source of mobile sensor vehicular traffic data and information, and indicated for each oriented road section of an exemplary part of an oriented road section network, in accordance with the present invention.

The overall data processing of Step (d) forms a current snapshot of NTT values on part of road network 12, and, thus, on part of oriented section network 14 (FIG. 1). The partiality of the vehicular traffic situation picture originates from the fact that only a portion of the roads in road network 12 are monitored in every calculation cycle. This partial picture is fused in the next step, Step (e), with similar partial current vehicular traffic situation pictures obtained from other sources, if any, according to a particular application of method/system 10, and, with specific reports received from traffic control authorities and others. FIG. 5 is a schematic diagram illustrating a partial current vehicular traffic situation picture, generally indicated as 110, featuring current NTT values, obtained from an exemplary network source 62 (FIG. 2) of mobile sensor vehicular traffic data and information, and indicated for each oriented road section of an exemplary part of an oriented road section network 14 (FIG. 1).

In Step (e), there is fusing the partial current traffic situation picture associated with each source, for generating a single complete current vehicular traffic situation picture associated with the entire oriented road section network.

The partial current traffic situation picture associated with each source, for the plurality of sources of vehicular traffic data and information, is fused by a Fusion and current Picture generator module 3, as indicated in FIG. 1, for generating a single complete current vehicular traffic situation picture associated with the entire oriented road section network. Due to the generic procedures of the data processing of method/system 10 (FIG. 1), representations of the partial current traffic situation pictures obtained from all mobile sources 62 are similar. Vehicular traffic data and information acquired from other types of sources, for example, acquired from sources 60 of fixed sensors, sources 64 of traffic reports by police or radio broadcasts of vehicular traffic data and information, and, sources 66, of other types of vehicular traffic data and information, are respectively processed. The acquiring of vehicular traffic data and information from the variety of sources, and integrating or fusing, by way of Fusion and current Picture generator software module 3, into one coherent or complete single current vehicular traffic situation picture is done in regular time intervals. For example, in a non-limiting way, the sequence of Steps (b)–(e) is performed at a pre-determined frequency in a range of from about once per every two minutes to about once per every ten minutes.

'Final' NTT values for each of the oriented road sections is obtained by integrating or fusing NTT values associated with all of the individual sources. NTT values associated with each source are weighed with a confidence factor appropriate for each respective source, where confidence factors are determined by source parameters, such as location accuracy, and, quality and quantity of sensors per source. This current vehicular traffic situation picture is not yet complete, because only a sub-group of the oriented road sections can be monitored at any particular time interval. The gaps in the current partial vehicular traffic situation picture are filled in using two procedures, described as follows.

In the first procedure, gaps are filled in using NTT values that are predicted, for those missing oriented road sections, in previous cycles of the process, that is, in previous time intervals of performing Steps (b)–(e) of method/system 10. In the initial cycles of the process, some default values are determined by the analysis of historical vehicular traffic data and information, and road types. It is to be emphasized, that this stage of the overall process is continuously performed, and therefore, each single complete current vehicular traffic situation picture associated with the entire oriented road section network is based on the combination of predictions and new vehicular traffic data and information.

In the second procedure, gaps in the current partial vehicular traffic situation picture are filled in by using a set of vehicular traffic rules for describing the interdependence, interrelation, and mutual correlation of vehicular traffic parameters among the plurality of oriented road sections in a particular region. Some of the vehicular traffic rules supply default values of the vehicular traffic parameters. The vehicular traffic rules are derived by, and based on, analyzing historical vehicular traffic data and information.

In Step (i), there is predicting a future complete vehicular traffic situation picture associated with the entire oriented road section network.

Predicting a future complete vehicular traffic situation picture associated with the entire oriented road section network is performed by a Predictor software module 4, as indicated in FIG. 1. From the previous step, Step (e), the single complete current vehicular traffic situation picture associated with the entire oriented road section network, which is obtained by fusing the partial current traffic situation picture associated with each source, for the plurality of sources of vehicular traffic data and information, serves as a baseline or starting point for predicting future layers of vehicular traffic situation pictures. Step (f) is performed at a pre-determined frequency in a range of from about once per every two minutes to about once per every ten minutes. Typically, for implementation, in a non-limiting fashion, the frequency of performing this step is usually less than the frequency of performing Steps (b)–(e).

The concept of the model of the comprehensive oriented road section network 14 (FIG. 1), dictates the process and the set of prediction tools for implementing method/system 10. Forming current vehicular traffic situation pictures, and forecasting or predicting future vehicular traffic situation pictures, are determined with the aid of vehicular traffic behavior patterns and rules, which are generated by a Patterns and rules generator module 6, as indicated in FIG. 1.

Vehicular traffic behavior patterns feature behavior rules of individual oriented road sections and correlation rules among the plurality of different oriented road sections, of the entire oriented road section network 14. Accordingly, by using both types of rules, the step of predicting a future complete vehicular traffic situation picture associated with a particular oriented road section in a region within the entire oriented road section network, is influenced by both the current vehicular traffic situation picture associated with that particular oriented road section, and, by the plurality of current vehicular traffic situation pictures associated with other oriented road sections in the same region of the entire oriented road section network.

Figure 6:
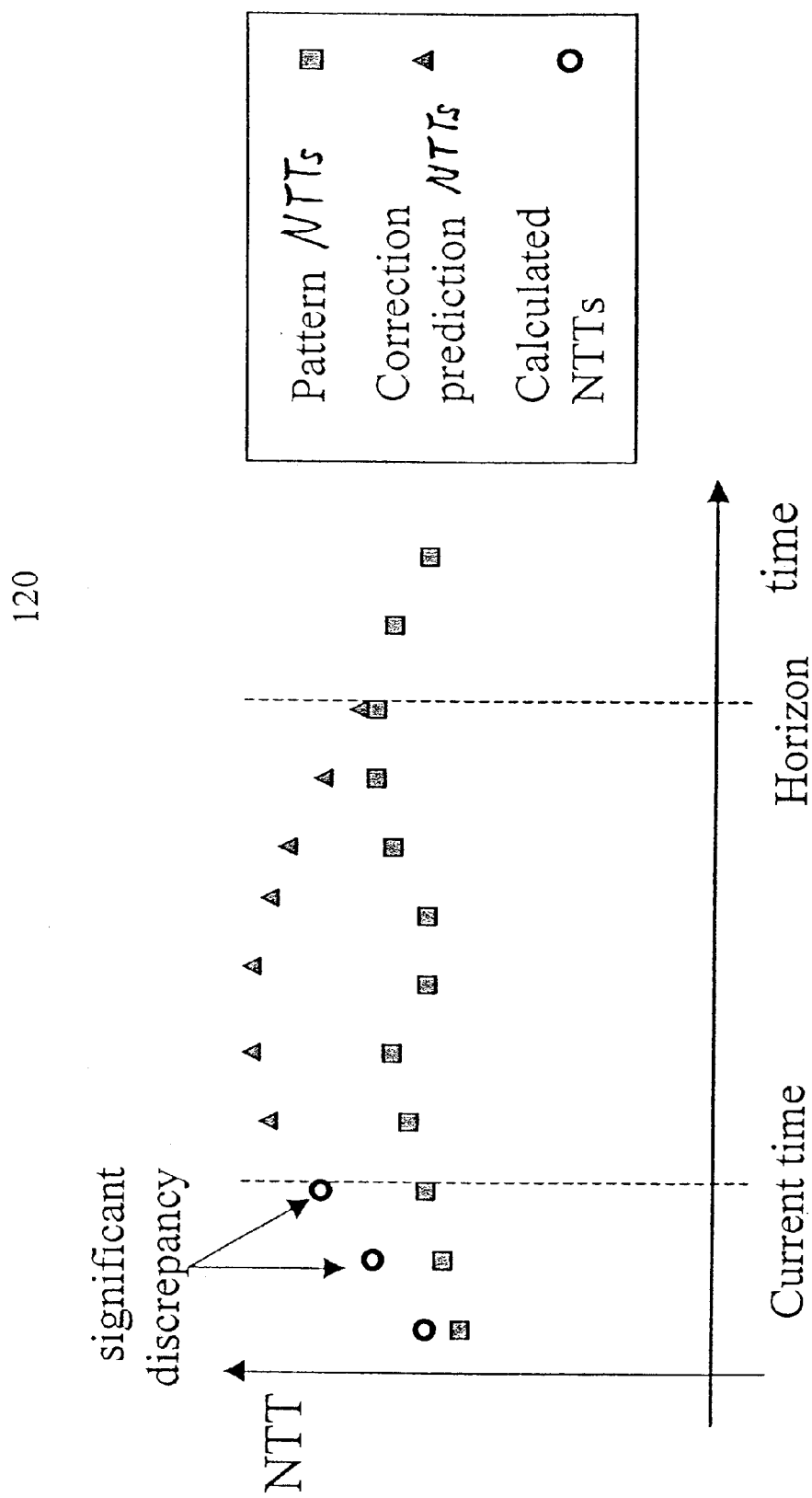
FIG. 6 is a graph illustrating an example of vehicular traffic behavior associated with an exemplary oriented road section, in terms of different NTT values plotted as a function of time in accordance with the present invention.

FIG. 6 is a graph, general indicated as graph 120, illustrating an example of vehicular traffic behavior associated with an exemplary oriented road section, in terms of different NTT values plotted as a function of time. Information featured in FIG. 6 demonstrates an example of an event identification and its influence on prediction of a future vehicular traffic situation picture. The vehicular traffic behavior is associated with an exemplary oriented road section out of historical vehicular traffic data and information. When compared to calculated NTT values, indicated by hollow circles, determined from actual data, a significant discrepancy is observed. In this example, calculated NTT values are significantly higher than pattern NTT values, indicated by solid squares, determined from the vehicular traffic pattern based on historical vehicular traffic data and information. The resulting correction prediction NTT values, associated with the exemplary oriented road section, are indicated by solid triangles. The correction prediction NTT values are the NTT values that will be incorporated and fused into layers of future vehicular traffic situation pictures, associated with this particular oriented road section, for the 'prediction horizon' time period. These layers are permanently corrected with the formation of the current vehicular traffic situation pictures in following processing cycles.

The continuously updated comprehensive and complete current vehicular traffic situation picture serves as a baseline of a three-dimensional vehicular traffic forecast picture, where the horizontal plane represents the roadmap and the vertical axis represents progression of time. The three dimensional vehicular traffic situation picture is constructed from discreet layers of vehicular traffic situation pictures, in time-intervals of a given processing cycle. The lower layer vehicular traffic situation picture always corresponds to the current time, and higher layers of vehicular traffic situation pictures correspond to future predictions.

Future time layers are produced by operating prediction tools that are products of the analysis of historical vehicular traffic data and information. This analysis is an on-going processing of the incoming vehicular traffic data and information, and the main resulting tools are behavior patterns and correlation rules. A behavior pattern of a specific oriented road section describes the regular changing of the associated NTT values as a function of time, for example, during minute and hourly progression of a day. Every oriented road section has its own behavior pattern, and different behavior patterns describe the behavior in different circumstances, such as different days of the week, holidays, special events, weather conditions, and so on.

A correlation rule determines the correlation and interrelation of the vehicular traffic situation picture between different oriented road sections as a function of time. Correlation rules are mostly if-then rules. For example, they represent the fact that 'if' a road congestion is being observed on oriented road section A, 'then', a similar road congestion is expected to occur on oriented road section B after a certain period of time. These rules are the outcome of a data-mining operation, also known as an advanced database searching procedure, on the historical vehicular traffic data and information.

Oriented road sections tend to behave differently even without the attachment of a certain characteristic to each vehicular traffic behavior pattern. The observance of values of the current vehicular traffic situation picture in respect to optional vehicular traffic behavior patterns, and the operation of vehicular traffic pattern recognition methods determines the vehicular traffic pattern that describes the behavior of the oriented road section at an instant of time.

Furthermore, while regular situations are handled with these tools, unexpected vehicular traffic developments are identified from the current vehicular traffic situation pictures by comparing them to regular vehicular traffic behavior patterns. The set of several recently calculated NTT values on each oriented road section is compared to the pattern that describes the behavior of this oriented road section. Any significant discrepancy from the pattern activates a respective correction of the NTT values predicted for this section in the near future. The corrections are assuming continuous change rates and a 'back-to-normal' return after a prediction horizon period, as previously described above and graphically illustrated in FIG. 6. If the discrepancy identified is the result of a major event with prolonged influence, the acquired data in the subsequent processing cycles will prolong the correction period beyond the horizon period, until the gap between the regular pattern values and the acquired data is reduced.

Determination of the future behavior of individual oriented road sections from their respective traffic behavior patterns is integrated with the mutual horizontal influence of adjacent oriented road sections using the previously described correlation rules. These rules can predict for example, the outcome of traffic events identified by the said discrepancies, and, predict their propagation in time along adjacent, and non-adjacent, oriented road sections.

In Step (g), there is using the current vehicular traffic situation picture and the future vehicular traffic situation picture for providing a variety of vehicular traffic related service applications to end users.

Method/system 10 (FIG. 1) of the present invention especially includes features for using the vehicular traffic data and information for comprehensively, yet, accurately and practicably, describing current and predicting future vehicular traffic situations and scenarios, from which the processed vehicular traffic data and information are used for providing the variety of vehicular traffic related service applications to the end users. Using the current vehicular traffic situation picture and the future vehicular traffic situation picture, obtained from the previous processing steps of method/system 10 (FIG. 1), for providing a variety of vehicular traffic related service applications to end users, is performed by a Service engine software module 5, as indicated FIG. 1.

Figure 7:
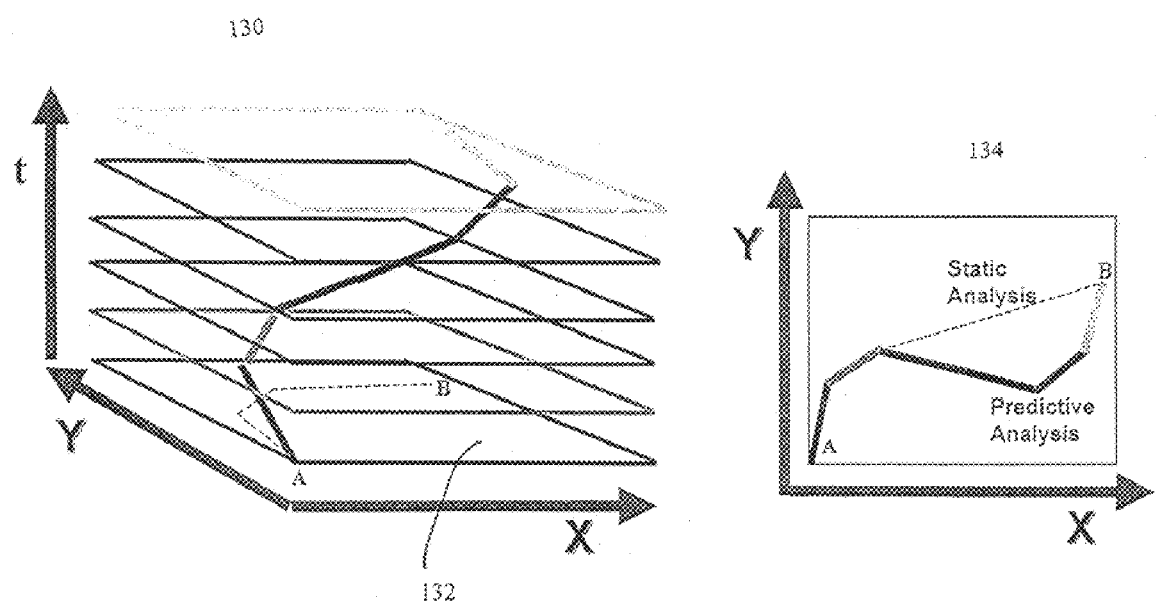
FIG. 7 is a graphical diagram illustrating usage of a three-dimensional vehicular traffic situation picture for providing route recommendation types of traffic related service applications to end users in accordance with the present invention.
Figure 8:
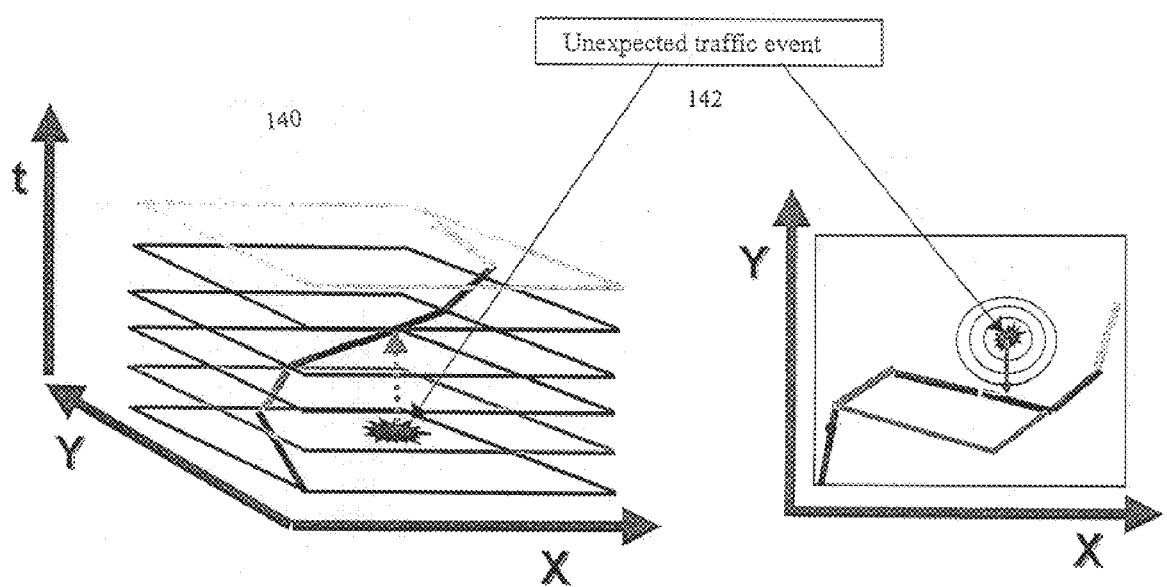
FIG. 8 is a graphical diagram illustrating usage of a three-dimensional vehicular traffic situation picture for providing traffic alerts and alternative route recommendation types of traffic related service applications to end users in accordance with the present invention.

The unique structure of the three dimensional vehicular traffic situation picture leads to a corresponding method of analyzing it, in order to respond to traffic oriented queries associated with a variety of traffic related service applications. This analysis is performed by a designated software module, Service engine software module 5, for a variety of vehicular traffic related service applications 7, as indicated in FIG. 1. This software engine is capable of finding optimal routes between given points, estimating travel times and initiating alerts and route alterations when unexpected traffic events change the vehicular traffic situation picture. Any traffic related service application 7 featuring such queries can receive the necessary vehicular traffic data and information by simply connecting to Service engine software module 5 through the appropriate interface. FIG. 7 and FIG. 8 show two exemplary ways in which three-dimensional vehicular traffic situation pictures are used to enhance providing traffic related service applications 7 to end users.

FIG. 7 is a graphical diagram illustrating usage of a three-dimensional vehicular traffic situation picture for providing route recommendation types of traffic related service applications to end users. In FIG. 7, three-dimensional vehicular traffic situation picture, generally indicated as 130, has each time-layer marked with its time-stamp (t-axis). In a current time, represented by lowest layer 132, a query arrives from a service application 7 (FIG. 1), inquiring for the fastest route from A to B. A recommendation based on the current vehicular traffic situation picture alone is shown by the dotted line on right hand graph 134. With the three-dimensional prediction model, a parallel recommendation analyzes the alternatives in a way that every particular oriented road section is chosen in respect to the predicted vehicular traffic situation 'at the time of passage of that particular oriented road section'. The choice of the oriented road section is a function both of its predicted NTT value and the confidence factor of that prediction. This last factor is determined for oriented road sections according to the regularity, the stability, and, the fluctuation rate of the historical behavior of each evaluated oriented road section. Comparative results of using a static analysis and the predictive analysis can be quite different, as shown in graph 134.

FIG. 8 is a graphical diagram illustrating usage of a three-dimensional vehicular traffic situation picture for providing traffic alerts and alternative route recommendation types of traffic related service applications to end users. In FIG. 8, three-dimensional vehicular traffic situation picture, generally indicated as 140, has each time-layer marked with its time-stamp (t-axis). FIG. 8 shows the same model for initiation of alerts and recommendations of alternative routes. The 'unexpected' traffic event 142 that happens at the current lower layer, time, is way off the recommended route. However, the correlation rules show that the influence of unexpected traffic event 142 will propagate in time, resulting in road congestion that will reach one of the oriented road sections of the recommended route 'at the time that the vehicle is supposed to pass unexpected traffic event 142. Therefore, an alert is sent to the driver with a recommendation of one or more known alternative routes.

Method/system 10 of the present invention provides vehicular traffic data and information, and, provides a variety of vehicular traffic related service applications to end users, on the basis of existing infrastructure of vehicular traffic data and information acquisition and collection, such as by using a cellular phone mobile communication network, and the construction of centralized dynamic vehicular traffic situation pictures, both current and future, for a geographical area within road network 12 (FIG. 1). The character of the vehicular traffic data and information and processing of it requires unique, elaborate, and comprehensive, handling during the entire sequence of processing steps, Steps (a) through (g), as is represented in the above description.

The present invention is implemented for acquiring, modeling, and processing vehicular traffic data and information, in order to be compatible with a wide variety of end user types of traffic related service applications. Therefore, it is a main aspect of the present invention that the 'data providing mobile sensors' are not limited to being those which are associated with the particular end users of such traffic related service applications. Hence, acquiring the vehicular traffic data and information from the data providing network does not depend at all on a specific group of mobile sensor device carrying end users.

The final result of method/system 10 (FIG. 1) is, therefore, a continuously on-going repetitive sequence of generating dynamic vehicular traffic situation pictures. The sequence is updated in pre-determined time intervals, as previously described above, preferably, in a range of between about once per every two minutes to about once per every ten minutes. The described sequence of generating dynamic three-dimensional vehicular traffic situation pictures serves as a highly accurate and precise data base for vehicular traffic related service applications.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for modeling and processing vehicular traffic data and information, comprising the steps of:
   (a) transforming a spatial representation of a road network associated with the vehicular traffic data and information into a network of spatially interdependent and interrelated oriented road sections, for forming an oriented road section network;
   (b) acquiring a variety of the vehicular traffic data and information associated with said oriented road section network, from a variety of sources;
   (c) prioritizing, filtering, and controlling, the vehicular traffic data and information acquired from each of said variety of sources;
   (d) calculating a mean normalized travel time (NTT) value from a plurality of normalized travel time (NTT) values of each of a plurality of vehicles, normalized with respect to a pre-determined distance, for each said oriented road section of said oriented road section network using said prioritized, filtered, and controlled, vehicular traffic data and information associated with each said source, for forming a partial current vehicular traffic situation picture associated with each said source; and
   (e) fusing said partial current traffic situation picture associated with each said source, for generating a single complete current vehicular traffic situation picture associated with entire said oriented road section network and with said road network.

2. The method of claim 1, whereby said road network is a geographical information system (GIS) road network encompassing a local or wide area region within which is a plurality of sub-regions, sub-areas, and, other designated sub-divisions selected from the group consisting of roads, turns, junctions, areas or regions of variably populated streets and roads, and combinations thereof.

3. The method of claim 1, whereby each said oriented road section of said oriented road section network represents a road section having a single vehicular traffic continuation option located at a head end road junction, said road section represents a unit featuring a plurality of consecutive road segments of said road network, said consecutive road segments positioned head-to-tail relative to each other are located between two road junctions, a tail end road junction and a said head end road junction, within said road network, and are characterized by similar vehicular traffic data and information, and, said single vehicular traffic continuation option refers to one of various vehicular traffic flow options said each vehicle may take within said road network.

4. The method of claim 3, whereby said vehicular traffic continuation option is selected from the group consisting of continuing to travel straight, taking a right turn, and, taking a left turn, from a said road segment joined or linked to a said head end road junction.

5. The method of claim 3, whereby, when special lanes in various said road segments within said oriented road section network are assigned to turning traffic, respective said oriented road sections may yield different vehicular traffic data and information.

6. The method of claim 3, whereby a particular traffic situation or scenario characterizing a particular said oriented road section is interdependent and interrelated with other particular said traffic situations or scenarios characterizing other particular said oriented road sections of said oriented road section network.

7. The method of claim 1, whereby said variety of sources of the vehicular traffic data and information is selected from the group consisting of sources of fixed sensors, sources of mobile sensors, sources of traffic reports by police or radio broadcasts of the vehicular traffic data and information, sources of historical and event related vehicular traffic data and information, other sources of the vehicular traffic data and information, and combinations thereof, whereby each said source is characterized by a variable level of accuracy.

8. The method of claim 1, whereby said variety of sources of the vehicular traffic data and information includes a plurality of vehicle-carried mobile sensors of at least one type of mobile wireless communication or telemetric system.

9. The method of claim 8, whereby said vehicle-carried mobile sensors are selected from the group consisting of GPS devices, vehicle anti-theft devices, computer laptop devices, cellular phone devices, and, combinations thereof.

10. The method of claim 1, whereby step (b) includes said acquiring the vehicular traffic data and information from at least one type of mobile wireless communication or telemetric system by tracking locations of a sample of a plurality of mobile sensors that are carried in moving vehicles as footprints of said mobile sensors.

11. The method of claim 10, whereby said vehicle-carried mobile sensors are selected from the group consisting of GPS devices, vehicle anti-theft devices, computer laptop devices, cellular phone devices, and, combinations thereof.

12. The method of claim 1, whereby said source of the vehicular traffic data and information is a plurality of vehicle-carried mobile sensors of at least one type of mobile wireless communication or telemetric system, and, whereby in step (b) locations of said mobile sensors are obtained from said mobile wireless communication or telemetric system in known time intervals, whereby a path of said each vehicle is identified in terms of a plurality of said oriented road sections of said oriented road section network.

13. The method of claim 1, whereby said variety of sources of the vehicular traffic data and information includes a plurality of vehicle-carried mobile sensors of at least one type of mobile wireless communication or telemetric system, and, whereby step (c) includes identifying said mobile sensors having a relatively fast movement indicating vehicular movement.

14. The method of claim 13, whereby said vehicle-carried mobile sensors are selected from the group consisting of GPS devices, vehicle anti-theft devices, computer laptop devices, cellular phone devices, and, combinations thereof.

15. The method of claim 1, whereby said variety of sources of the vehicular traffic data and information includes a plurality of vehicle-carried mobile cellular phones of at least one type of mobile wireless cellular phone communication system, and, whereby step (c) includes identifying said mobile cellular phones whose cell transition or handover rates indicate a relatively fast movement indicating vehicular movement.

16. A The method of claim 1, whereby said variety of sources of the vehicular traffic data and information includes a plurality of vehicle-carried mobile vehicle anti-theft devices of at least one type of mobile wireless vehicle anti-theft communication system, and, whereby step (c) includes identifying said mobile vehicle anti-theft devices indicating ignition activation potentially indicating vehicular movement.

17. The method of claim 1, whereby said variety of sources of the vehicular traffic data and information includes a plurality of vehicle-carried mobile sensors of at least one type of mobile wireless communication or telemetric system, and, whereby step (c) includes identifying said mobile sensors having a relatively fast movement indicating vehicular movement, and, tracking locations of said mobile sensors by using locating parameters selected from the group consisting of mobile wireless communication cell geometrical area transitions or handovers, location data and information provided by a server of said mobile wireless communication or telemetric system, and, combinations thereof, as footprints of said mobile sensors.

18. The method of claim 17, whereby said tracking is performed by polling said locations of said mobile sensors in known time intervals.

19. The method of claim 17, whereby step (c) further comprises the steps of:
 (i) filtering out said mobile sensors that are recognized as noise,
 (ii) prioritizing said acquired vehicular traffic data and information according to policy or present vehicular traffic circumstances,
 (iii) preventing said tracking of said mobile sensors that stopped moving, and
 (iv) maintaining said tracking within locating capacity of each said mobile wireless communication or telemetric system.

20. The method of claim 17, whereby steps (b) and (c) further include said acquiring the vehicular traffic data and information by a procedure selected from the group consisting of a push procedure, a pull procedure, and, combinations thereof, said push procedure is a mode of said acquiring the vehicular traffic data and information initiated by said mobile sensors, and, said pull procedure is a mode of said acquiring the vehicular traffic data and information initiated by a software module sampling said mobile sensors.

21. The method of claim 17, whereby said tracking is controlled according to a predefined and updated policy selected from the group consisting of not to track too many said vehicles in a same region of said road network, focus said tracking on a certain problematic region of said road network, stop said tracking said vehicles that stopped for a pre-determined time interval, collect the vehicular traffic data and information within a certain limited capacity of a said mobile wireless communication or telemetric system, and, combinations thereof.

22. The method of claim 17, whereby step (c) further includes a procedure for protecting privacy of individuals associated with said vehicle-carried mobile sensors.

23. The method of claim 17, whereby step (c) further includes a procedure for protecting privacy of individuals associated with said vehicle-carried mobile sensors by deleting identities of said identified mobile sensors and by deleting said locations of said tracked mobile sensors following derived velocities of said mobile sensors are incorporated into calculations and processing associated with said oriented road sections of said oriented road section network.

24. The method of claim 1, whereby in step (d) said pre-determined distance is in a range of between about 10 meters to about 100 meters.

25. The method of claim 17, whereby in step (d) a said normalized travel time (NTT) value of a specific said oriented road section is calculated by statistically processing said tracked locations and velocities of said mobile sensors traveled on said specific oriented road section during a time period of an assessment cycle.

26. The method of claim 17, whereby in step (d) said plurality of normalized travel time (NTT) values of a specific said oriented road section is calculated by statistically processing said tracked locations and velocities of said mobile sensors traveled on said specific oriented road section during a time period of an assessment cycle, for indicating possibility of different said velocities on different lanes of said specific oriented road section.

27. The method of claim 17, whereby step (d) includes deducing a path of said each vehicle from several consecutive readings of said tracked locations, said deduced path is a sequence of connected said oriented road sections that cross said geometrical area locations in order of appearance and which join into a logical route to take between two points within said oriented road section network representing said road network.

28. The method of claim 27, whereby a said plurality of normalized travel time (NTT) values on each said oriented road section of said deduced path is calculated by using timings and said tracked locations of said footprints of said mobile sensors determined by using assumptions as to reasonable acceleration and velocity behaviors of vehicular drivers of said plurality of vehicles moving on said road network.

29. The method of claim 17, whereby in step (d) said mean normalized travel time (NTT) values are calculated using a confidence factor being a function of accuracy of said footprints, amount of said footprints, and, error rate of said footprints, of said identified and tracked mobile sensors.

30. The method of claim 1, whereby sequence of steps (b)–(e) is performed at a pre-determined frequency in a range of from about once per every two minutes to about once per every ten minutes.

31. The method of claim 1, whereby step (e) is performed at regular time intervals.

32. The method of claim 1, whereby step (e) includes calculating final values of said mean normalized travel time (NTT) for said oriented road sections by integrating and fusing said calculated mean normalized travel time (NTT) values of said oriented road sections associated with each said source of the vehicular traffic data and information.

33. The method of claim 1, whereby step (e) includes filling in gaps of said partial current traffic situation picture by using predicted said normalized travel time (NTT) values for said normalized travel time (NTT) values of said oriented road sections not calculated in a previous cycle of steps (b)–(d).

34. The method of claim 1, whereby step (e) includes filling in gaps of said partial current traffic situation picture by using a set of vehicular traffic behavior patterns and correlation rules, derived by and based on analyzing historical vehicular traffic data and information, for describing interdependence, interrelation, and mutual correlation of vehicular traffic parameters among said oriented road sections in a particular region of said oriented road section network representing said road network.

35. The method of claim 1, whereby step (e) includes using time dependent behavior patterns of said oriented road section network and time dependent correlation rules of said oriented road section network.

36. The method of claim 35, whereby a said time dependent behavior pattern of a specific said oriented road section describes regular changing of associated said normalized travel time (NTT) values as a function of time, and, whereby said time dependent correlation rule determines correlation and interrelation of each said single complete current vehicular traffic situation picture between different said oriented road sections as a function of time.

37. The method of claim 1, further comprising the step of:
(f) predicting at least one future time complete vehicular traffic situation picture associated with said entire oriented road section network.

38. The method of claim 37, whereby said generated single complete current vehicular traffic situation picture of step (e) serves as a baseline or starting point for said predicting said at least one future time complete vehicular traffic situation picture.

39. The method of claim 37, whereby said predicting is performed at a pre-determined frequency in a range of from about once per every two minutes to about once per every ten minutes.

40. The method of claim 37, whereby said predicting includes using time dependent behavior patterns of said oriented road section network and time dependent correlation rules of said oriented road section network.

41. The method of claim 40, whereby a said time dependent behavior pattern of a specific said oriented road section describes regular changing of associated said normalized travel time (NTT) values as a function of time, and, whereby said time dependent correlation rule determines correlation and interrelation of each said single complete current vehicular traffic situation picture between different said oriented road sections as a function of time.

42. The method of claim 40, whereby said predicting includes identifying unexpected vehicular traffic developments from a said generated single complete current vehicular traffic situation picture of step (e) by comparing said developments to regular said time dependent behavior patterns of said oriented road section network, using said normalized travel time (NTT) values, and correcting said normalized travel time (NTT) values according to discrepancies from said time dependent behavior patterns.

43. The method of claim 40, whereby said predicting includes predicting propagation, in time along adjacent and non-adjacent said oriented road sections, of traffic events identified by discrepancies from said time dependent behavior patterns of said oriented road section network, using said time dependent correlation rules of said oriented road section network.

44. The method of claim 37, further comprising the step of:
(g) using at least one said complete current vehicular traffic situation picture and said at least one future time complete vehicular traffic situation picture for providing a variety of vehicular traffic related service applications to end users.

45. The method of claim 44, whereby said variety of vehicular traffic related service applications includes responding to traffic oriented queries selected from the group consisting of finding optimal routes between given points of said road network, finding alternative routes between said given points of said road network, estimating travel times between said given points of said road network, initiating alerts and route alterations when unexpected traffic events change said complete current vehicular traffic situation picture, and, combinations thereof.

46. A method for acquiring vehicular traffic data and information, comprising:
(a) transforming a spatial representation of a road network associated with the vehicular traffic data and information into a network of spatially interdependent and interrelated oriented road sections, for forming an oriented road section network;
(b) acquiring a variety of the vehicular traffic data and information associated with said oriented road section network, from a variety of sources; and
(c) prioritizing, filtering, and controlling, the vehicular traffic data and information acquired from each of said variety of sources.

47. The method of claim 46, whereby said road network is a geographical information system (GIS) road network encompassing a local or wide area region within which is a plurality of sub-regions, sub-areas, and, other designated sub-divisions selected from the group consisting of roads, turns, junctions, areas or regions of variably populated streets and roads, and, combinations thereof.

48. The method of claim 46, whereby each said oriented road section of said oriented road section network represents a road section having a single vehicular traffic continuation option located at a head end road junction, said road section represents a unit featuring a plurality of consecutive road segments of said road network, said consecutive road segments positioned head-to-tail relative to each other are located between two road junctions, a tail end road junction and a said head end road junction, within said road network, and are characterized by similar vehicular traffic data and information, and, said single vehicular traffic continuation option refers to one of various vehicular traffic flow options a vehicle may take within said road network.

49. The method of claim 48, whereby said vehicular traffic continuation option is selected from the group consisting of continuing to travel straight, taking a right turn, and, taking a left turn, from a said road segment joined or linked to a said head end road junction.

50. The method of claim 49, whereby, when special lanes in various said road segments within said oriented road section network are assigned to turning traffic, respective said oriented road sections may yield different vehicular traffic data and information.

51. The method of claim 49, whereby a particular traffic situation or scenario characterizing a particular said oriented road section is interdependent and interrelated with other particular said traffic situations or scenarios characterizing other particular said oriented road sections of said oriented road section network.

52. The method of claim 46, whereby said variety of sources of the vehicular traffic data and information is selected from the group consisting of sources of fixed sensors, sources of mobile sensors, sources of traffic reports by police or radio broadcasts of the vehicular traffic data and information, sources of historical and event related vehicular traffic data and information, other sources of the vehicular traffic data and information, and combinations thereof, whereby each said source is characterized by a variable level of accuracy.

53. The method of claim 46, whereby said variety of sources of the vehicular traffic data and information includes a plurality of vehicle-carried mobile sensors of at least one type of mobile wireless communication or telemetric system.

54. The method of claim 53, whereby said vehicle-carried mobile sensors are selected from the group consisting of GPS devices, vehicle anti-theft devices, computer laptop devices, cellular phone devices, and, combinations thereof.

55. The method of claim 46, whereby step (b) includes said acquiring the vehicular traffic data and information from at least one type of mobile wireless communication or telemetric system by tracking locations of a sample of a plurality of mobile sensors that are carried in moving vehicles as footprints of said mobile sensors.

56. The method of claim 55, whereby said vehicle-carried mobile sensors are selected from the group consisting of GPS devices, vehicle anti-theft devices, computer laptop devices, cellular phone devices, and, combinations thereof.

57. The method of claim 46, whereby said source of the vehicular traffic data and information is a plurality of vehicle-carried mobile sensors of at least one type of mobile wireless communication or telemetric system, and, whereby in step (b) locations of said mobile sensors are obtained from said mobile wireless communication or telemetric system in known time intervals, whereby a path of a vehicle is identified in terms of a plurality of said oriented road sections of said oriented road section network.

58. The method of claim 46, whereby said variety of sources of the vehicular traffic data and information includes a plurality of vehicle-carried mobile sensors of at least one type of mobile wireless communication or telemetric system, and, whereby step (c) includes identifying said mobile sensors having a relatively fast movement indicating vehicular movement.

59. The method of claim 58, whereby said vehicle-carried mobile sensors are selected from the group consisting of GPS devices, vehicle anti-theft devices, computer laptop devices, cellular phone devices, and, combinations thereof.

60. The method of claim 46, whereby said variety of sources of the vehicular traffic data and information includes a plurality of vehicle-carried mobile cellular phones of at least one type of mobile wireless cellular phone communication system, and, whereby step (c) includes identifying said mobile cellular phones whose cell transition or handover rates indicate a relatively fast movement indicating vehicular movement.

61. The method of claim 46, whereby said variety of sources of the vehicular traffic data and information includes a plurality of vehicle-carried mobile vehicle anti-theft devices of at least one type of mobile wireless vehicle anti-theft communication system, and, whereby step (c) includes identifying said mobile vehicle anti-theft devices indicating ignition activation potentially indicating vehicular movement.

62. The method of claim 46, whereby said variety of sources of the vehicular traffic data and information includes a plurality of vehicle-carried mobile sensors of at least one type of mobile wireless communication or telemetric system, and, whereby step (c) includes identifying said mobile sensors having a relatively fast movement indicating vehicular movement, and, tracking locations of said mobile sensors by using locating parameters selected from the group consisting of mobile wireless communication cell geometrical area transitions or handovers, location data and information provided by a server of said mobile wireless communication or telemetric system, and, combinations thereof, as footprints of said mobile sensors.

63. The method of claim 62, whereby said tracking is performed by polling said locations of said mobile sensors in known time intervals.

64. The method of claim 62, whereby step (c) further comprises the steps of:
   (i) filtering out said mobile sensors that are recognized as noise,
   (ii) prioritizing said acquired vehicular traffic data and information according to policy or present vehicular traffic circumstances,
   (iii) preventing said tracking of said mobile sensors that stopped moving, and
   (iv) maintaining said tracking within locating capacity of each said mobile wireless communication or telemetric system.

65. The method of claim 62, whereby steps (b) and (c) further include said acquiring the vehicular traffic data and information by a procedure selected from the group consisting of a push procedure, a pull procedure, and, combinations thereof, said push procedure is a mode of said acquiring the vehicular traffic data and information initiated by said mobile sensors, and, said pull procedure is a mode of said acquiring the vehicular traffic data and information initiated by a software module sampling said mobile sensors.

66. The method of claim 62, whereby said tracking is controlled according to a predefined and updated policy selected from the group consisting of not to track too many vehicles in a same region of said road network, focus said tracking on a certain problematic region of said road network, stop said tracking said vehicles that stopped for a pre-determined time interval, collect the vehicular traffic data and information within a certain limited capacity of a said mobile wireless communication or telemetric system, and, combinations thereof.

67. The method of claim 62, whereby step (c) further includes a procedure for protecting privacy of individuals associated with said vehicle-carried mobile sensors.

68. The method of claim 62, whereby step (c) further includes a procedure for protecting privacy of individuals associated with said vehicle-carried mobile sensors by deleting identities of said identified mobile sensors and by deleting said locations of said tracked mobile sensors following derived velocities of said mobile sensors are incorporated into calculations and processing associated with said oriented road sections of said oriented road section network.

69. A The method of claim 46, whereby sequence of steps (b)–(c) is performed at a pre-determined frequency in a range of from about once per every two minutes to about once per every ten minutes.

70. A method for calculating mean normalized travel times of vehicles from vehicular traffic data and information, comprising:
   (a) transforming a spatial representation of a road network associated with the vehicular traffic data and information into a network of spatially interdependent and interrelated oriented road sections, for forming an oriented road section network;
   (b) acquiring a variety of the vehicular traffic data and information associated with said oriented road section network, from a variety of sources;
   (c) prioritizing, filtering, and controlling, the vehicular traffic data and information acquired from each of said variety of sources; and
   (d) calculating the mean normalized travel time (NTT) value from a plurality of normalized travel time (NTT) values of each of a plurality of the vehicles, normalized with respect to a pre-determined distance, for each said oriented road section of said oriented road section network using said prioritized, filtered, and controlled, vehicular traffic data and information associated with each said source, for forming a set of the mean normalized travel time (NTT) values of the vehicles within said road network.

71. The method of claim 70, whereby said road network is a geographical information system (GIS) road network encompassing a local or wide area region within which is a plurality of sub-regions, sub-areas, and, other designated sub-divisions selected from the group consisting of roads, turns, junctions, areas or regions of variably populated streets and roads, and combinations thereof.

72. The method of claim 70, whereby each said oriented road section of said oriented road section network represents a road section having a single vehicular traffic continuation option located at a head end road junction, said road section represents a unit featuring a plurality of consecutive road segments of said road network, said consecutive road segments positioned head-to-tail relative to each other are located between two road junctions, a tail end road junction and a said head end road junction, within said road network, and are characterized by similar vehicular traffic data and information, and, said single vehicular traffic continuation option refers to one of various vehicular traffic flow options the vehicles may take within said road network.

73. The method of claim 72, whereby said vehicular traffic continuation option is selected from the group consisting of continuing to travel straight, taking a right turn, and, taking a left turn, from a said road segment joined or linked to a said head end road junction.

74. The method of claim 72, whereby, when special lanes in various said road segments within said oriented road section network are assigned to turning traffic, respective said oriented road sections may yield different vehicular traffic data and information.

75. The method of claim 72, whereby a particular traffic situation or scenario characterizing a particular said oriented road section is interdependent and interrelated with other particular said traffic situations or scenarios characterizing other particular said oriented road sections of said oriented road section network.

76. The method of claim 70, whereby said variety of sources of the vehicular traffic data and information is selected from the group consisting of sources of fixed sensors, sources of mobile sensors, sources of traffic reports by police or radio broadcasts of the vehicular traffic data and information, sources of historical and event related vehicular traffic data and information, other sources of the vehicular traffic data and information, and combinations thereof, whereby each said source is characterized by a variable level of accuracy.

77. The method of claim 70, whereby said variety of sources of the vehicular traffic data and information includes a plurality of vehicle-carried mobile sensors of at least one type of mobile wireless communication or telemetric system.

78. The method of claim 77, whereby said vehicle-carried mobile sensors are selected from the group consisting of GPS devices, vehicle anti-theft devices, computer laptop devices, cellular phone devices, and, combinations thereof.

79. The method of claim 70, whereby step (b) includes said acquiring the vehicular traffic data and information from at least one type of mobile wireless communication or telemetric system by tracking locations of a sample of a plurality of mobile sensors that are carried in moving vehicles as footprints of said mobile sensors.

80. The method of claim 79, whereby said vehicle-carried mobile sensors are selected from the group consisting of GPS devices, vehicle anti-theft devices, computer laptop devices, cellular phone devices, and, combinations thereof.

81. The method of claim 70, whereby said source of the vehicular traffic data and information is a plurality of vehicle-carried mobile sensors of at least one type of mobile wireless communication or telemetric system, and, whereby in step (b) locations of said mobile sensors are obtained from said mobile wireless communication or telemetric system in known time intervals, whereby a path of each of the vehicles is identified in terms of a plurality of said oriented road sections of said oriented road section network.

82. The method of claim 70, whereby said variety of sources of the vehicular traffic data and information includes a plurality of vehicle-carried mobile sensors of at least one type of mobile wireless communication or telemetric system, and, whereby step (c) includes identifying said mobile sensors having a relatively fast movement indicating vehicular movement.

83. The method of claim 82, whereby said vehicle-carried mobile sensors are selected from the group consisting of GPS devices, vehicle anti-theft devices, computer laptop devices, cellular phone devices, and, combinations thereof.

84. The method of claim 70, whereby said variety of sources of the vehicular traffic data and information includes a plurality of vehicle-carried mobile cellular phones of at least one type of mobile wireless cellular phone communication system, and, whereby step (c) includes identifying said mobile cellular phones whose cell transition or handover rates indicate a relatively fast movement indicating vehicular movement.

85. The method of claim 70, whereby said variety of sources of the vehicular traffic data and information includes a plurality of vehicle-carried mobile vehicle anti-theft devices of at least one type of mobile wireless vehicle anti-theft communication system, and, whereby step (c) includes identifying said mobile vehicle anti-theft devices indicating ignition activation potentially indicating vehicular movement.

86. The method of claim 70, whereby said variety of sources of the vehicular traffic data and information includes a plurality of vehicle-carried mobile sensors of at least one type of mobile wireless communication or telemetric system, and, whereby step (c) includes identifying said mobile sensors having a relatively fast movement indicating vehicular movement, and, tracking locations of said mobile sensors by using locating parameters selected from the group consisting of mobile wireless communication cell geometrical area transitions or handovers, location data and information provided by a server of said mobile wireless communication or telemetric system, and, combinations thereof, as footprints of said mobile sensors.

87. The method of claim 86, whereby said tracking is performed by polling said locations of said mobile sensors in known time intervals.

88. The method of claim 86, whereby step (c) further comprises:
(i) filtering out said mobile sensors that are recognized as noise,
(ii) prioritizing said acquired vehicular traffic data and information according to policy or present vehicular traffic circumstances,
(iii) preventing said tracking of said mobile sensors that stopped moving, and
(iv) maintaining said tracking within locating capacity of each said mobile wireless communication or telemetric system.

89. The method of claim 86, whereby steps (b) and (c) further include said acquiring the vehicular traffic data and information by a procedure selected from the group consisting of a push procedure, a pull procedure, and, combinations thereof, said push procedure is a mode of said acquiring the vehicular traffic data and information initiated by said mobile sensors, and, said pull procedure is a mode of said acquiring the vehicular traffic data and information initiated by a software module sampling said mobile sensors.

90. The method of claim 86, whereby said tracking is controlled according to a predefined and updated policy selected from the group consisting of not to track too many of the vehicles in a same region of said road network, focus said tracking on a certain problematic region of said road network, stop said tracking of the vehicles that stopped for a pre-determined time interval, collect the vehicular traffic data and information within a certain limited capacity of a said mobile wireless communication or telemetric system, and, combinations thereof.

91. The method of claim 86, whereby step (c) further includes a procedure for protecting privacy of individuals associated with said vehicle-carried mobile sensors.

92. The method of claim 86, whereby step (c) further includes a procedure for protecting privacy of individuals associated with said vehicle-carried mobile sensors by deleting identities of said identified mobile sensors and by deleting said locations of said tracked mobile sensors following derived velocities of said mobile sensors are incorporated into calculations and processing associated with said oriented road sections of said oriented road section network.

93. The method of claim 70, whereby in step (d) said pre-determined distance is in a range of between about 10 meters to about 100 meters.

94. The method of claim 86, whereby in step (d) a said normalized travel time (NTT) value of a specific said oriented road section is calculated by statistically processing said tracked locations and velocities of said mobile sensors traveled on said specific oriented road section during a time period of an assessment cycle.

95. The method of claim 86, whereby in step (d) said plurality of normalized travel time (NTT) values of a specific said oriented road section is calculated by statistically processing said tracked locations and velocities of said mobile sensors traveled on said specific oriented road section during a time period of an assessment cycle, for indicating possibility of different said velocities on different lanes of said specific oriented road section.

96. The method of claim 86, whereby step (d) includes deducing a path of said each vehicle from several consecutive readings of said tracked locations, said deduced path is a sequence of connected said oriented road sections that cross said geometrical area locations in order of appearance and which join into a logical route to take between two points within said oriented road section network representing said road network.

97. The method of claim 96, whereby a said plurality of normalized travel time (NTT) values on each said oriented road section of said deduced path is calculated by using timings and said tracked locations of said footprints of said mobile sensors determined by using assumptions as to reasonable acceleration and velocity behaviors of vehicular drivers of the vehicles moving on said road network.

98. The method of claim 86, whereby in step (d) said mean normalized travel time (NTT) values are calculated using a confidence factor being a function of accuracy of said footprints, amount of said footprints, and, error rate of said footprints, of said identified and tracked mobile sensors.

99. The method of claim 70, whereby sequence of steps (b)–(d) is performed at a pre-determined frequency in a range of from about once per every two minutes to about once per every ten minutes.

100. The method of claim 70, further comprising the step of:
(e) calculating final values of said mean normalized travel time (NTT) for said oriented road sections by integrating and fusing said calculated mean normalized travel time (NTT) values of said oriented road sections associated with each said source of the vehicular traffic data and information.

101. The method of claim 100, whereby step (e) includes predicting said normalized travel time (NTT) values for said normalized travel time (NTT) values of said oriented road sections not calculated in a previous cycle of steps (b)–(d).

102. The method of claim 100, whereby step (e) includes using a set of vehicular traffic behavior patterns and correlation rules, derived by and based on analyzing historical vehicular traffic data and information, for describing interdependence, interrelation, and mutual correlation of vehicular traffic parameters among said oriented road sections in a particular region of said oriented road section network representing said road network.

103. The method of claim 100, whereby step (e) includes using time dependent behavior patterns of said oriented road section network and time dependent correlation rules of said oriented road section network.

104. The method of claim 103, whereby a said time dependent behavior pattern of a specific said oriented road section describes regular changing of associated said normalized travel time (NTT) values as a function of time, and, whereby said time dependent correlation rule determines correlation and interrelation of each said single complete current vehicular traffic situation picture between different said oriented road sections as a function of time.

105. A system for modeling and processing vehicular traffic data and information, comprising:
(a) a transform mechanism for transforming a spatial representation of a road network associated with the vehicular traffic data and information into a network of spatially interdependent and interrelated oriented road sections, for forming an oriented road section network;
(b) a sampler software module operatively interacting with said transform mechanism, for acquiring a variety of the vehicular traffic data and information associated with said oriented road section network, from a variety of sources, and, for prioritizing, filtering, and controlling, the vehicular traffic data and information acquired from each of said variety of sources;

(c) a normalized travel time (NTT) calculator software module for calculating a mean normalized travel time (NTT) value from a plurality of normalized travel time (NTT) values of each of a plurality of vehicles, normalized with respect to a pre-determined distance, for each said oriented road section of said oriented road section network by using said prioritized, filtered, and controlled, vehicular traffic data and information associated with each said source, supplied by said sampler software module, for forming a partial current vehicular traffic situation picture associated with each said source; and (d) a fusion and current picture generator module for fusing said partial current traffic situation picture associated with each said source, supplied by said normalized travel time (NTT) calculator software module, for generating a single complete current vehicular traffic situation picture associated with entire said oriented road section network and with said road network.

106. The system of claim 105, whereby said road network is a geographical information system (GIS) road network encompassing a local or wide area region within which is a plurality of sub-regions, sub-areas, and, other designated sub-divisions selected from the group consisting of roads, turns, junctions, areas or regions of variably populated streets and roads, and combinations thereof.

107. The system of claim 105, whereby each said oriented road section of said oriented road section network represents a road section having a single vehicular traffic continuation option located at a head end road junction, said road section represents a unit featuring a plurality of consecutive road segments of said road network, said consecutive road segments positioned head-to-tail relative to each other are located between two road junctions, a tail end road junction and a said head end road junction, within said road network, and are characterized by similar vehicular traffic data and information, and, said single vehicular traffic continuation option refers to one of various vehicular traffic flow options said each vehicle may take within said road network.

108. The system of claim 107, whereby said vehicular traffic continuation option is selected from the group consisting of continuing to travel straight, taking a right turn, and, taking a left turn, from a said road segment joined or linked to a said head end road junction.

109. The system of claim 107, whereby, when special lanes in various said road segments within said oriented road section network are assigned to turning traffic, respective said oriented road sections may yield different vehicular traffic data and information.

110. The system of claim 107, whereby a particular traffic situation or scenario characterizing a particular said oriented road section is interdependent and interrelated with other particular said traffic situations or scenarios characterizing other particular said oriented road sections of said oriented road section network.

111. The system of claim 105, whereby said variety of sources of the vehicular traffic data and information is selected from the group consisting of sources of fixed sensors, sources of mobile sensors, sources of traffic reports by police or radio broadcasts of the vehicular traffic data and information, sources of historical and event related vehicular traffic data and information, other sources of the vehicular traffic data and information, and combinations thereof, whereby each said source is characterized by a variable level of accuracy.

112. The system of claim 105, whereby said variety of sources of the vehicular traffic data and information includes a plurality of vehicle-carried mobile sensors of at least one type of mobile wireless communication or telemetric system.

113. The system of claim 112, whereby said vehicle-carried mobile sensors are selected from the group consisting of GPS devices, vehicle anti-theft devices, computer laptop devices, cellular phone devices, and, combinations thereof.

114. The system of claim 105, whereby said sampler software module acquires the vehicular traffic data and information from at least one type of mobile wireless communication or telemetric system by tracking locations of a sample of a plurality of mobile sensors that are carried in moving vehicles as footprints of said mobile sensors.

115. The system of claim 114, whereby said vehicle-carried mobile sensors are selected from the group consisting of GPS devices, vehicle anti-theft devices, computer laptop devices, cellular phone devices, and, combinations thereof.

116. The system of claim 105, whereby said source of the vehicular traffic data and information is a plurality of vehicle-carried mobile sensors of at least one type of mobile wireless communication or telemetric system, and, whereby said sampler software module obtains locations of said mobile sensors from said mobile wireless communication or telemetric system in known time intervals, whereby a path of said each vehicle is identified in terms of a plurality of said oriented road sections of said oriented road section network.

117. The system of claim 105, whereby said variety of sources of the vehicular traffic data and information includes a plurality of vehicle-carried mobile sensors of at least one type of mobile wireless communication or telemetric system, and, whereby said sampler software module identifies said mobile sensors having a relatively fast movement indicating vehicular movement.

118. The system of claim 117, whereby said vehicle-carried mobile sensors are selected from the group consisting of GPS devices, vehicle anti-theft devices, computer laptop devices, cellular phone devices, and, combinations thereof.

119. The system of claim 105, whereby said variety of sources of the vehicular traffic data and information includes a plurality of vehicle-carried mobile cellular phones of at least one type of mobile wireless cellular phone communication system, and, whereby said sampler software module identifies said mobile cellular phones whose cell transition or handover rates indicate a relatively fast movement indicating vehicular movement.

120. The system of claim 105, whereby said variety of sources of the vehicular traffic data and information includes a plurality of vehicle-carried mobile vehicle anti-theft devices of at least one type of mobile wireless vehicle anti-theft communication system, and, whereby said sampler software module identifies said mobile vehicle anti-theft devices indicating ignition activation potentially indicating vehicular movement.

121. The system of claim 105, whereby said variety of sources of the vehicular traffic data and information includes a plurality of vehicle-carried mobile sensors of at least one type of mobile wireless communication or telemetric system, and, whereby said sampler software module identifies said mobile sensors having a relatively fast movement indicating vehicular movement, and, tracking locations of said mobile sensors by using locating parameters selected from the group consisting of mobile wireless communication cell geometrical area transitions or handovers, location data and information provided by a server of said mobile wireless communication or telemetric system, and, combinations thereof, as footprints of said mobile sensors.

122. The system of claim 121, whereby said tracking is performed by polling said locations of said mobile sensors in known time intervals.

123. The system of claim 121, whereby said sampler software module further performs the steps of:
(i) filtering out said mobile sensors that are recognized as noise,
(ii) prioritizing said acquired vehicular traffic data and information according to policy or present vehicular traffic circumstances,
(iii) preventing said tracking of said mobile sensors that stopped moving, and
(iv) maintaining said tracking within locating capacity of each said mobile wireless communication or telemetric system.

124. The system of claim 121, whereby said sampler software module acquires the vehicular traffic data and information by a procedure selected from the group consisting of a push procedure, a pull procedure, and, combinations thereof, said push procedure is a mode of said acquiring the vehicular traffic data and information initiated by said mobile sensors, and, said pull procedure is a mode of said acquiring the vehicular traffic data and information initiated by a software module sampling said mobile sensors.

125. The system of claim 121, whereby said tracking is controlled according to a predefined and updated policy selected from the group consisting of not to track too many said vehicles in a same region of said road network, focus said tracking on a certain problematic region of said road network, stop said tracking said vehicles that stopped for a pre-determined time interval, collect the vehicular traffic data and information within a certain limited capacity of a said mobile wireless communication or telemetric system, and, combinations thereof.

126. The system of claim 121, whereby said sampler software module further performs a procedure for protecting privacy of individuals associated with said vehicle-carried mobile sensors.

127. The system of claim 121, whereby said sampler software module further performs a procedure for protecting privacy of individuals associated with said vehicle-carried mobile sensors by deleting identities of said identified mobile sensors and by deleting said locations of said tracked mobile sensors following derived velocities of said mobile sensors are incorporated into calculations and processing associated with said oriented road sections of said oriented road section network.

128. The system of claim 105, whereby said pre-determined distance used by said normalized travel time (NTT) calculator software module is in a range of between about 10 meters to about 100 meters.

129. The system of claim 121, whereby said normalized travel time (NTT) value of a specific said oriented road section is calculated by statistically processing said tracked locations and velocities of said mobile sensors traveled on said specific oriented road section during a time period of an assessment cycle.

130. The system of claim 121, whereby said plurality of normalized travel time (NTT) values of a specific said oriented road section is calculated by statistically processing said tracked locations and velocities of said mobile sensors traveled on said specific oriented road section during a time period of an assessment cycle, for indicating possibility of different said velocities on different lanes of said specific oriented road section.

131. The system of claim 121, whereby said normalized travel time (NTT) calculator software module deduces a path of said each vehicle from several consecutive readings of said tracked locations, said deduced path is a sequence of connected said oriented road sections that cross said geometrical area locations in order of appearance and which join into a logical route to take between two points within said oriented road section network representing said road network.

132. The system of claim 131, whereby a said plurality of normalized travel time (NTT) values on each said oriented road section of said deduced path is calculated by using timings and said tracked locations of said footprints of said mobile sensors determined by using assumptions as to reasonable acceleration and velocity behaviors of vehicular drivers of said plurality of vehicles moving on said road network.

133. The system of claim 121, whereby said normalized travel time (NTT) calculator software module calculates said mean normalized travel time (NTT) values using a confidence factor being a function of accuracy of said footprints, amount of said footprints, and, error rate of said footprints, of said identified and tracked mobile sensors.

134. The system of claim 105, whereby said fusion and current picture generator module generates said single complete current vehicular traffic situation picture at a pre-determined frequency in a range of from about once per every two minutes to about once per every ten minutes.

135. The system of claim 105, whereby said fusion and current picture generator module generates said single complete current vehicular traffic situation picture at regular time intervals.

136. The system of claim 105, whereby said fusion and current picture generator module calculates final values of said mean normalized travel time (NTT) for said oriented road sections by integrating and fusing said calculated mean normalized travel time (NTT) values of said oriented road sections associated with each said source of the vehicular traffic data and information.

137. The system of claim 105, whereby said fusion and current picture generator module fills in gaps of said partial current traffic situation picture by using predicted said normalized travel time (NTT) values for said normalized travel time (NTT) values of said oriented road sections not previously calculated in a previous cycle by said normalized travel time (NTT) calculator software module.

138. The system of claim 105, whereby said fusion and current picture generator module fills in gaps of said partial current traffic situation picture by using a set of vehicular traffic behavior patterns and correlation rules, derived by and based on analyzing historical vehicular traffic data and information, for describing interdependence, interrelation, and mutual correlation of vehicular traffic parameters among said oriented road sections in a particular region of said oriented road section network representing said road network.

139. The system of claim 105, whereby said fusion and current picture generator module uses time dependent behavior patterns of said oriented road section network and time dependent correlation rules of said oriented road section network.

140. The system of claim 139, whereby a said time dependent behavior pattern of a specific said oriented road section describes regular changing of associated said normalized travel time (NTT) values as a function of time, and, whereby said time dependent correlation rule determines correlation and interrelation of each said single complete current vehicular traffic situation picture between different said oriented road sections as a function of time.

141. The system of claim 105, further comprising:
(e) a predictor software module operatively interacting with said fusion and current picture generator module, for predicting at least one future time complete vehicular traffic situation picture associated with said entire oriented road section network.

142. The system of claim 141, whereby said single complete current vehicular traffic situation picture generated by said fusion and current picture generator module serves as a baseline or starting point for said predicting said at least one future time complete vehicular traffic situation picture.

143. The system of claim 141, whereby said predicting is performed at a pre-determined frequency in a range of from about once per every two minutes to about once per every ten minutes.

144. The system of claim 141, whereby said predicting includes using time dependent behavior patterns of said oriented road section network and time dependent correlation rules of said oriented road section network.

145. The system of claim 144, whereby a said time dependent behavior pattern of a specific said oriented road section describes regular changing of associated said normalized travel time (NTT) values as a function of time, and, whereby said time dependent correlation rule determines correlation and interrelation of each said single complete current vehicular traffic situation picture between different said oriented road sections as a function of time.

146. The system of claim 144, whereby said predicting includes identifying unexpected vehicular traffic developments from a said generated single complete current vehicular traffic situation picture, by comparing said developments to regular said time dependent behavior patterns of said oriented road section network, using said normalized travel time (NTT) values, and correcting said normalized travel time (NTT) values according to discrepancies from said time dependent behavior patterns.

147. The system of claim 144, whereby said predicting includes predicting propagation, in time along adjacent and non-adjacent said oriented road sections, of traffic events identified by discrepancies from said time dependent behavior patterns of said oriented road section network, using said time dependent correlation rules of said oriented road section network.

148. The system of claim 141, further comprising:
(f) a service engine software module operatively interacting with said predictor software module, for using at least one said complete current vehicular traffic situation picture and said at least one future time complete vehicular traffic situation picture for providing a variety of vehicular traffic related service applications to end users.

149. The system of claim 148, whereby said variety of vehicular traffic related service applications includes responding to traffic oriented queries selected from the group consisting of finding optimal routes between given points of said road network, finding alternative routes between said given points of said road network, estimating travel times between said given points of said road network, initiating alerts and route alterations when unexpected traffic events change said complete current vehicular traffic situation picture, and, combinations thereof.

* * * * *